(12) United States Patent
Yang et al.

(10) Patent No.: US 12,340,360 B2
(45) Date of Patent: Jun. 24, 2025

(54) SYSTEMS AND METHODS FOR ITEM RECOGNITION

(71) Applicant: Maplebear Inc., San Francisco, CA (US)

(72) Inventors: Shiyuan Yang, Shanghai (CN); Lin Gao, Syosset, NY (US); Yufeng He, Shanghai (CN); Xiao Zhou, Shanghai (CN); Yilin Huang, Shanghai (CN); Griffin Kelly, Chicago, IL (US); Isabel Tsai, New York, NY (US); Ahmed Beshry, Queens, NY (US)

(73) Assignee: Maplebear Inc., San Francisco, CA (US)

( * ) Notice: Subject to any disclaimer, the term of this patent is extended or adjusted under 35 U.S.C. 154(b) by 204 days.

(21) Appl. No.: 17/950,310

(22) Filed: Sep. 22, 2022

(65) Prior Publication Data
US 2023/0087587 A1    Mar. 23, 2023

(30) Foreign Application Priority Data
Sep. 23, 2021  (CN) .......................... 202111110492.6

(51) Int. Cl.
*G06Q 20/20* (2012.01)
*B62B 3/14* (2006.01)
*G07G 1/00* (2006.01)

(52) U.S. Cl.
CPC ............ *G06Q 20/208* (2013.01); *B62B 3/14* (2013.01); *G07G 1/0045* (2013.01); *B62B 2203/50* (2013.01)

(58) Field of Classification Search
CPC .... G06Q 20/208; B62B 3/14; B62B 2203/50; B62B 3/1424; B62B 5/0096;
(Continued)

(56) References Cited

U.S. PATENT DOCUMENTS 7,909,248 B1 *  3/2011  Goncalves ........... G07G 1/0072
                                                235/462.14
9,424,480 B2 *  8/2016  Hastings .............. G06V 10/768
(Continued)

FOREIGN PATENT DOCUMENTS

CN          109741552 B          5/2019

OTHER PUBLICATIONS

James, Namitha, et al. "Automated checkout for stores: A computer vision approach." Revista Geintec-Gestao Inovacao E Tecnologias 11.3 (2021): 1830-1841. (Year: 2021).*
(Continued)

*Primary Examiner* — Nathan A Mitchell
(74) *Attorney, Agent, or Firm* — Fenwick & West LLP

(57) ABSTRACT

Self-checkout vehicle systems and methods comprising a self-checkout vehicle having a camera(s), a weight sensor (s), and a processor configured to: (i) identify via computer vision a merchandise item selected by a shopper based on an identifier affixed to the selected item, and (ii) calculate a price of the merchandise item based on the identification and weight of the selected item. Computer vision systems and methods for identifying merchandise selected by a shopper comprising a processor configured to: (i) identify an identifier affixed to the selected merchandise and an item category of the selected merchandise, and (ii) compare the identifier and item category identified in each respective image to determine the most likely identification of the merchandise.

30 Claims, 23 Drawing Sheets

(58) Field of Classification Search
CPC .. B62B 3/1428; G07G 1/0045; G07G 1/0072; G01G 19/4144; G06N 3/0464; G06N 3/08; G06V 10/82; G06V 30/14; G06V 30/413

See application file for complete search history.

(56) References Cited

U.S. PATENT DOCUMENTS

| | | | |
|---|---|---|---|
| 10,953,906 B1 | 3/2021 | McMahon et al. | |
| 11,481,751 B1* | 10/2022 | Chaubard | G06V 10/82 |
| 11,568,140 B2* | 1/2023 | Anisimovich | G06N 3/082 |
| 11,798,380 B2* | 10/2023 | Brakob | G06V 10/764 |
| 2005/0178840 A1 | 8/2005 | Chang et al. | |
| 2011/0000963 A1* | 1/2011 | Mercado | G06Q 20/201 |
| | | | 235/383 |
| 2011/0129117 A1* | 6/2011 | Ross | G06V 10/143 |
| | | | 382/103 |
| 2013/0001295 A1* | 1/2013 | Goncalves | G07G 1/0072 |
| | | | 235/375 |
| 2014/0064559 A1* | 3/2014 | Sugasawa | G06V 20/20 |
| | | | 382/103 |
| 2016/0328660 A1* | 11/2016 | Huang | G07G 1/0045 |
| 2017/0344972 A1* | 11/2017 | Sasaki | G06V 10/40 |
| 2018/0218351 A1 | 8/2018 | Chaubard et al. | |
| 2019/0318336 A1* | 10/2019 | Mihara | G07G 1/0054 |
| 2020/0151692 A1 | 5/2020 | Gao et al. | |
| 2020/0302209 A1* | 9/2020 | Slattery | G06V 30/155 |
| 2020/0327521 A1* | 10/2020 | Song | A47F 9/048 |
| 2021/0019722 A1* | 1/2021 | Sawada | G06Q 20/203 |
| 2021/0374376 A1* | 12/2021 | Swope | G06K 7/1417 |
| 2022/0076227 A1* | 3/2022 | Shi | G07G 1/0072 |
| 2022/0202210 A1* | 6/2022 | Yang | G06F 18/2413 |
| 2023/0005342 A1* | 1/2023 | Brakob | G07G 1/0045 |
| 2023/0048635 A1* | 2/2023 | Kravitz | G06V 20/52 |
| 2024/0013633 A1* | 1/2024 | Brakob | G06V 10/762 |

OTHER PUBLICATIONS

PCT International Search Report and Written Opinion, PCT Application No. PCT/US2022/44340, 13 pages.

* cited by examiner

SYSTEMS AND METHODS FOR ITEM RECOGNITION

CROSS-REFERENCE TO RELATED APPLICATION

This application claims priority under 35 U.S.C. § 119 to Chinese Patent Application No. 202111110492.6, filed Sep. 23, 2021, the disclosure of which is incorporated by reference herein in its entirety.

BACKGROUND

Shopping can be a cumbersome and even stressful experience. Currently, to purchase an item, a customer or cashier must remove each item from a shopping cart, locate a barcode on the product, scan the product, then place it back in the cart. Long lines form at checkout counters due to cashiers or customers having to search for and scan barcodes. This process becomes even more time consuming when a code must be manually entered, as is often the case for produce, since the shopper must not only locate the price lookup (PLU) code sticker on the produce, but also rotate the item so that he or she can read the numbers and then enter the numbers manually into a point-of-sale (POS) terminal. The produce must also be weighed to determine the correct price, further adding complexity to the process.

A few companies have begun introducing "smart" shopping carts in an effort to improve the shopping experience. For example, some have barcode scanners and point-of-sale (POS) terminals mounted on the cart, allowing a shopper to scan and pay for his or her merchandise without having to wait in a checkout line. Still others may feature built-in scales for weighing produce. Still, many such systems require the shopper to go through the somewhat awkward and time consuming process described above multiple times during any given shopping trip.

Therefore, there is a need for a self-checkout vehicle system that is capable of automatically identifying, weighing, and calculating the price of a merchandise item selected by a shopper. There is a further need for a computer vision system that can be used in conjunction with a self-checkout vehicle that enables the identification of merchandise regardless of the type of identifier (e.g., global trade identification number (GTIN), PLU code, barcode, etc.) affixed to the merchandise item.

SUMMARY

In one aspect, the present disclosure is directed to a self-checkout vehicle system for automatically identifying, weighing, and calculating the price of a merchandise item. The self-checkout vehicle system may include a self-checkout vehicle, such as a shopping cart and/or a conveying station, that may be equipped with one or more cameras configured to capture one or more images of a merchandise item selected by a shopper operating the self-checkout vehicle. The self-checkout vehicle system, according to various embodiments, may include at least one weight sensor mounted in the self-checkout vehicle and configured to measure a weight of a selected merchandise item when placed in the self-checkout vehicle. The self-checkout vehicle system may additionally or alternatively include at least one processor adapted to obtain computer-executable instructions stored on a non-transitory medium that, when executed by the at least one processor, cause the at least one processor to perform one or more computer implemented steps for identifying, weighing, and calculating the price of the selected merchandise. The one or more computer implemented steps (also referred to as simply "steps" herein), in various embodiments, may include a step to identify, from the image(s) using a computer vision technique, the selected merchandise item based on a identifier affixed to the selected merchandise item, as well as a step to calculate, based on the identification of the selected merchandise item and the measured weight, a price of the merchandise item.

According to various embodiments, at least one of the camera(s) of the self-checkout vehicle system may be positioned and oriented such that its field of view comprises an area of the self-checkout vehicle in which the selected merchandise is placed. In some embodiments, the field of view further comprises at least one of the weight sensor(s) so that the item need not be placed in two separate locations to be identified and weighed. The steps may further include instructions that cause the processor(s) to identify a probabilistic orientation of a identifier; determining, based on the probabilistic orientation, a degree by which to rotate the identifier image in order to orient the identifier in a predetermined orientation (e.g., right-side-up); and rotating the image of the identifier by the predetermined degree. Rotating the identifier by the determined degree permits the selected merchandise to be placed in the self-checkout vehicle with the identifier in any orientation according to some embodiments. According to various embodiments, the identifier includes at least one of global trade item number (GTIN), a price lookup (PLU) code, or a barcode.

The self-checkout vehicle system, in various embodiments, may be further configured to monitor a weight measurement provided by the weight sensor(s) to detect a decrease in the measured weight indicative of a merchandise item being removed from the self-checkout vehicle. Additionally or alternatively, the system may be configured to detect movement of a merchandise item indicative of the merchandise item being removed from the self-checkout vehicle. For example, detecting movement of the merchandise item indicative of the merchandise item being removed from the self-checkout vehicle may comprise at least one of detecting vertical movement of the merchandise item beyond a predefined threshold distance; or detecting an absence of the merchandise item in an image captured by the one or more camera(s), wherein the merchandise item was previously present in an image previously captured by the one or more camera(s). In an embodiment, the system may be configured to compare a first weight measurement captured prior to detecting the absence of the merchandise item with a second weight measurement captured at or after detecting the absence of the merchandise item, and determine that the merchandise item was removed if a difference in the first weight measurement and the second weight measurement corresponds with the measured weight of the selected merchandise item when originally placed in the self-checkout vehicle. In various embodiments, the system may be configured to identify, from one or more images captured by the camera(s) using computer vision, the merchandise item being removed from the self-checkout vehicle.

In another aspect, the present disclosure is directed to a computer vision system for identifying merchandise. The computer vision system may include, and/or shares with the self-checkout vehicle system, at least one processor adapted to obtain computer-executable instructions stored on a non-transitory medium that, when executed by the at least one processor, cause the at least one processor to (i) identify, in one or more images of merchandise selected by a shopper, a identifier affixed to the selected merchandise, (ii) direct the processor to identify, based on at least one of the image(s), an item category of the selected merchandise, and (iii) compare the identifier and item category identified in each respective image to determine the most likely identification of the merchandise.

The computer vision system, in various embodiments, may include instructions for localizing a portion of the image containing the identifier, and applying an optical character recognition (OCR) technique to the localized portion of the image containing the identifier to identify text defining the identifier. According to various embodiments, the instructions may cause the processor(s) to implement one or more of the steps of: detecting a location of the identifier in the image; distinguishing, at the detected location, those pixels of the image comprising the identifier from those pixels of the image comprising the selected merchandise; and rotating those pixels of the image comprising the identifier into a predetermined orientation. In some embodiments, detecting the location of the identifier in the image comprises the processor(s) executing instructions for identifying, in the respective image, a probabilistic region in which the identifier is contained; and/or generating a bounding box surrounding the probabilistic region.

Distinguishing those pixels of the image comprising the identifier from those pixels of the image comprising the selected merchandise, in various embodiments, may comprise the processor(s) executing one or more of the steps of: generating a naïve item category of the selected merchandise; comparing pixels of the image at the location with pixels associated with the naïve item category; identifying, from the comparison of pixels, those pixels which are dissimilar from the pixels associated with the naïve item category; and identifying the dissimilar pixels as those pixels comprising the identifier. In some embodiments, rotating those pixels of the image comprising the identifier into the predetermined orientation comprises the processor(s) executing one or more of the steps of: identifying a probabilistic orientation of the identifier in the image; determining, based on the probabilistic orientation, a degree by which to rotate the identifier in order to orient the identifier in the predetermined orientation; and rotating the identifier by the determined degree.

According to some embodiments, applying an optical character recognition (OCR) technique to the localized portion of the image containing the identifier to identify text defining the identifier comprises the processor(s) performing one or more of the steps of: localizing, using a text detector, text in the localized portion of the image containing the identifier; rotating the localized text to a predetermined orientation; extracting one or more features of the text using a Convolutional Neural Network (CNN); and generating, using a Connectionist Temporal Classification (CTC), an output distribution over all possible text outputs. In some embodiments, the computer vision system may include computer implemented instructions for inferring, from the output distribution, a likely output; and identifying the text defining the identifier by one or more of: collapsing, in the likely output, any repeats; and removing, in the likely output, any blank symbols. The instruction may include, in various embodiments, one or more of: assessing, from the output distribution, the probability of a given output; and identifying the text defining the identifier from the output having the highest probability.

In some embodiments, applying an optical character recognition (OCR) technique to the localized portion of the image containing the identifier to identify text defining the identifier may comprise the processor(s) executing one or more of the steps of: localizing, using a text detector, text in the localized portion of the image containing the identifier; rotating the localized text to a predetermined orientation; splitting characters in the text using image binarizing and contour finding techniques; evaluating a batch of the characters using either a deep learning classifier or a machine learning classifier to recognize each character; and sequencing the recognized characters. Identifying an item category of the selected merchandise may comprise the processor(s) executing one or more steps including: localizing a portion of the image containing the selected merchandise; generating a feature representation of the selected merchandise depicted in the localized portion of the image; and comparing the feature representation of the selected merchandise with feature representations of a plurality of available merchandises in a dataset to identify the available merchandise having a feature representation most similar to that of the selected merchandise according to some embodiments.

Generating a feature representation of the selected merchandise depicted in the localized portion of the image, in various embodiments, may comprise the processor(s) generating a multi-dimensional vector map of features of the selected merchandise identified from the localized portion of the selected merchandise. In some embodiments, comparing the feature representation of the selected merchandise with feature representations of a plurality of available merchandises in a dataset to identify the available merchandise having a feature representation most similar to that of the selected merchandise comprises the processor(s) executing one or more instructions for: calculating a distance between the feature vectors of the selected merchandise and those of the plurality of available merchandises, and identifying the available merchandise having the minimum distances between its feature vectors and those of the selected merchandise.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
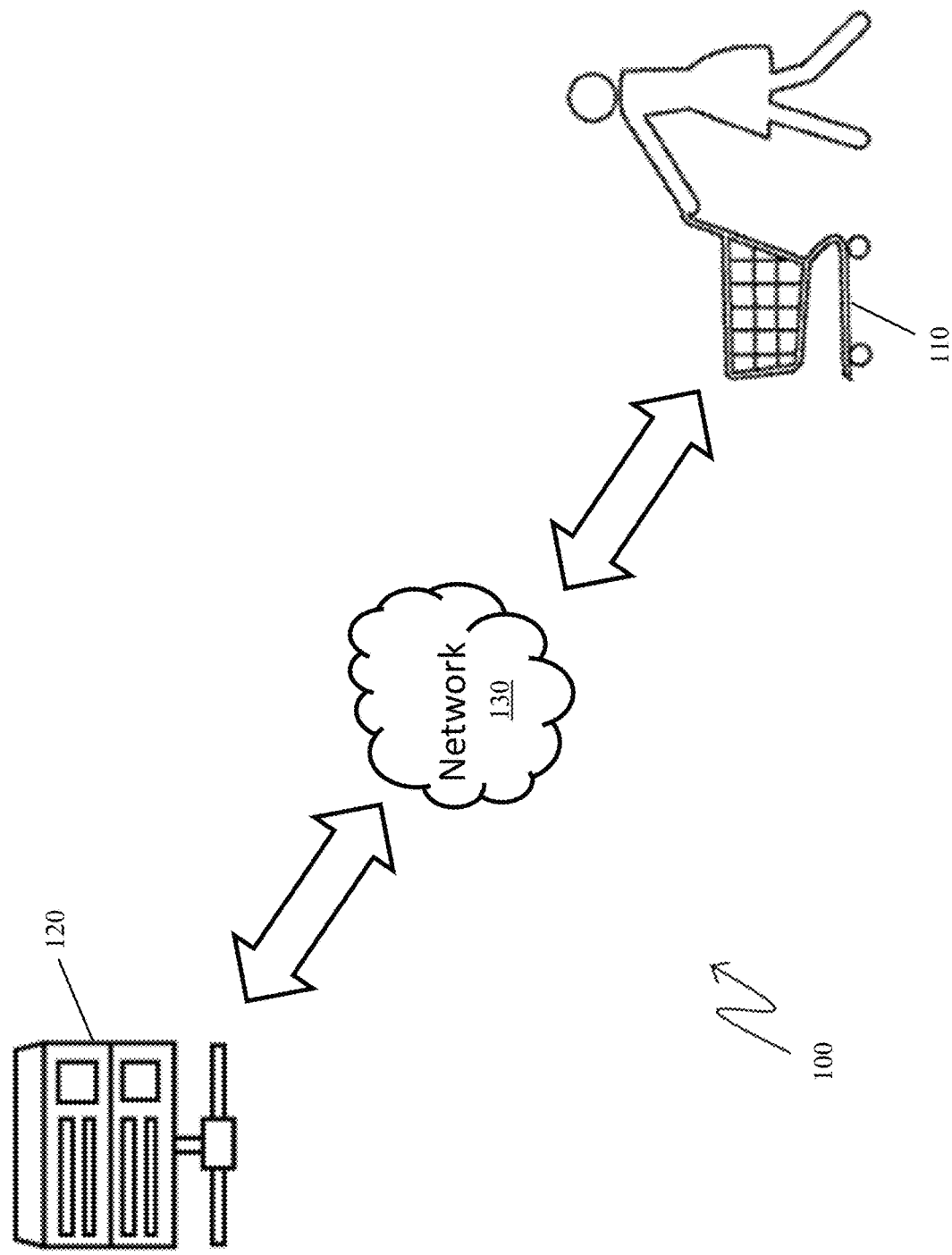
FIG. 1 illustrates a self-checkout vehicle system in accordance with various embodiments of the present disclosure.

The present disclosure is directed to a self-checkout vehicle system configured to automatically identify, weigh, and calculate the price of a merchandise item selected by a shopper. As configured, embodiments of the self-checkout vehicle system can improve the shopping experience in many ways. For example, by automatically identifying, weighing, and calculating the price of merchandise items when they are placed in a shopping cart, embodiments of the self-checkout system permit shoppers to simply remove a merchandise item from a shelf and place it in a shopping cart, without having to separately bring the merchandise item to one or more fixed terminals to check out (e.g., a point of sale (POS) terminal located near the store exit, and/or a terminal used to identify and weigh items and print out a sticker to be scanned at a POS terminal). For example, the self-checkout vehicle system, in various embodiments, may be configured such that the shopper need not (a) enter a code to identify the merchandise item, (b) weigh the merchandise item on a scale before placing it in the shopping cart, (c) optionally print out a label with the identity and weight of the merchandise item to be scanned at a fixed POS terminal, and (d) wait in line and pay at a fixed POS terminal. This may provide for a faster, smoother, and more convenient shopping experience, as later described in more detail.

The present disclosure is further directed to a computer vision system for identifying merchandise items selected by a shopper based on an identifier affixed to the merchandise items. Some embodiments of the computer vision system are particularly well adapted for use with produce items, which often have a sticker or other label featuring one or a combination of a Global Trade Item Number (GTIN), product lookup (PLU) code, barcode, or other means of identifying what the merchandise item that are typically scanned or manually entered into a fixed terminal by the shopper or a checkout clerk to identify the produce item for checkout purposes. The computer vision system of the present disclosure utilizes innovative architecture and techniques to locate and read such identifiers affixed to a merchandise item while being placed into a shopping cart, thereby avoiding the need for somebody (e.g., the shopper or checkout clerk) to separately scan or enter the identifier as part of a checkout process before the shopper can continue shopping or leave the store. Further, in various embodiments, the present computer vision system may be configured to locate and read the identifier regardless of its orientation in an image(s) captured by or otherwise provided to the computer vision system, thereby permitting the shopper to more casually place the merchandise item into a shopping cart without having to manipulate and hold the merchandise item such that the identifier is presented in a particular orientation in order to be read. Stated otherwise, the computer vision system, in various embodiments, may be configured to locate and read the identifier even if the merchandise item is not held directly in front of a camera and in a way that presents the identifier in a right-side-up orientation, as later described in more detail.

For ease of explanation, systems and methods of the present disclosure may be described in the context of shopping for produce items labeled with PLU codes using a shopping cart; however, the present disclosure is not intended to be limited as such. Instead, it should be recognized that the present systems and methods may be used with any merchandise item (i.e., not just produce) featuring an identifier (i.e., not just a PLU code), as well as with any conveyance used by shoppers to carry selected merchandise (i.e., not just shopping carts). Further, while the systems and methods disclosed herein may be described for use with merchandise items whose price is a function of weight (e.g., merchandise items having a price per pound), it should be recognized that in some embodiments, the self-checkout vehicle system and the computer vision system may be used with merchandise items that need not be weighed (e.g., merchandise items having a fixed price per item) and that in such cases, a load receiver/scale/weight sensor and related weighing functions are optionally not included.

Self-Checkout Vehicle System 100

FIG. 1 illustrates a self-checkout vehicle system 100 in accordance with various embodiments of the present disclosure. Generally speaking, self-checkout vehicle system 100 may include a self-checkout vehicle 110 (e.g., shopping cart) for use in collecting merchandise items selected by a shopper and one or more processors 120 configured to identify the selected merchandise items 10 from an image(s) captured by a camera(s) 114 (later shown in FIG. 2) mounted on self-checkout vehicle 110. The processor(s) 120, in an embodiment, may be located onboard self-checkout vehicle 110 (not shown) while in other embodiments, the processor 120 (or one or more of multiple processors 120) may be located remote from self-checkout vehicle 100 and connected thereto via a network 130 (shown). Referring ahead to FIG. 3, in a representative embodiment, certain merchandise item recognition functionality may be executed remotely on a remote processor 120*a* while other functionality may be executed locally on an onboard processor 120*b*, as later described in more detail.

Figure 2:
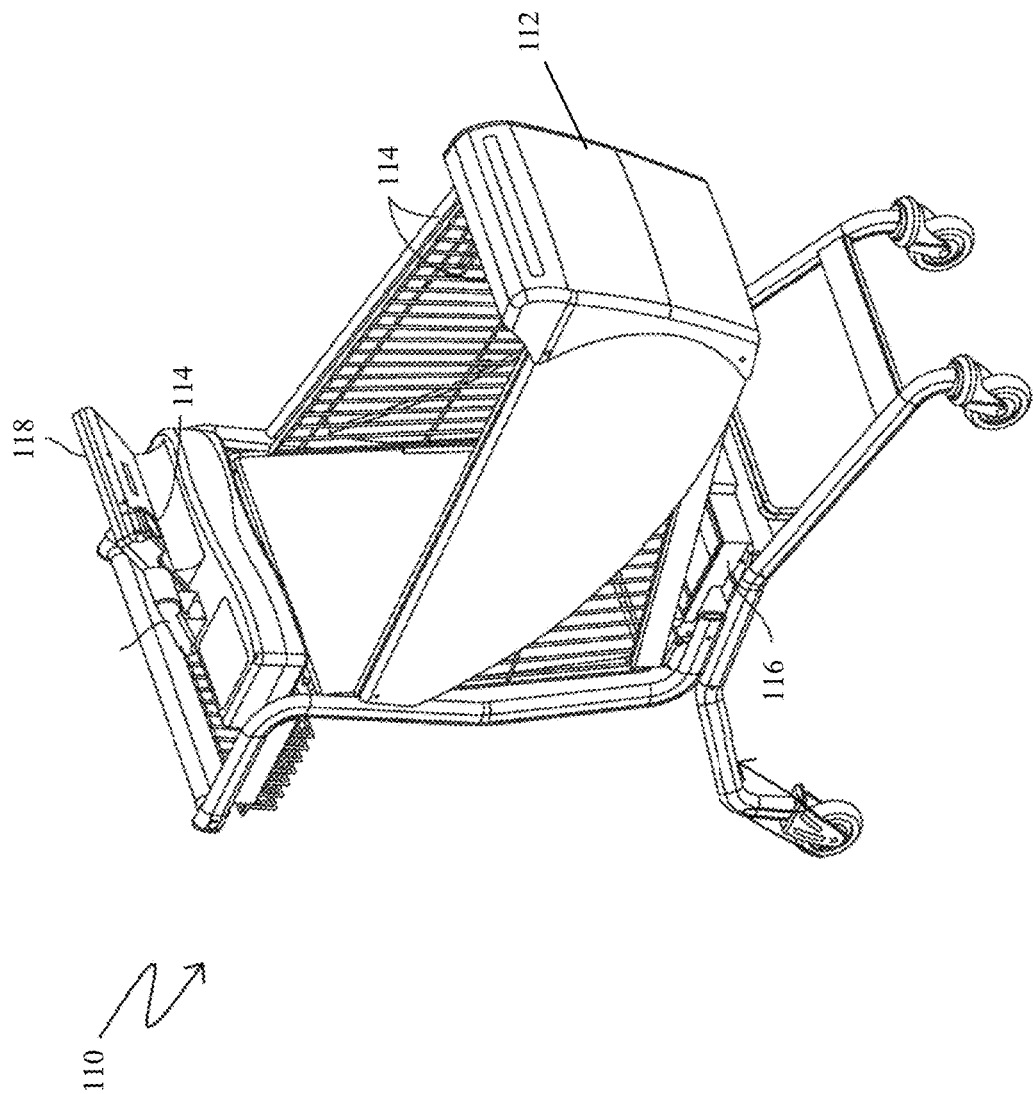
FIG. 2 illustrates a self-checkout vehicle in accordance with various embodiments of the present disclosure.
Figure 3:
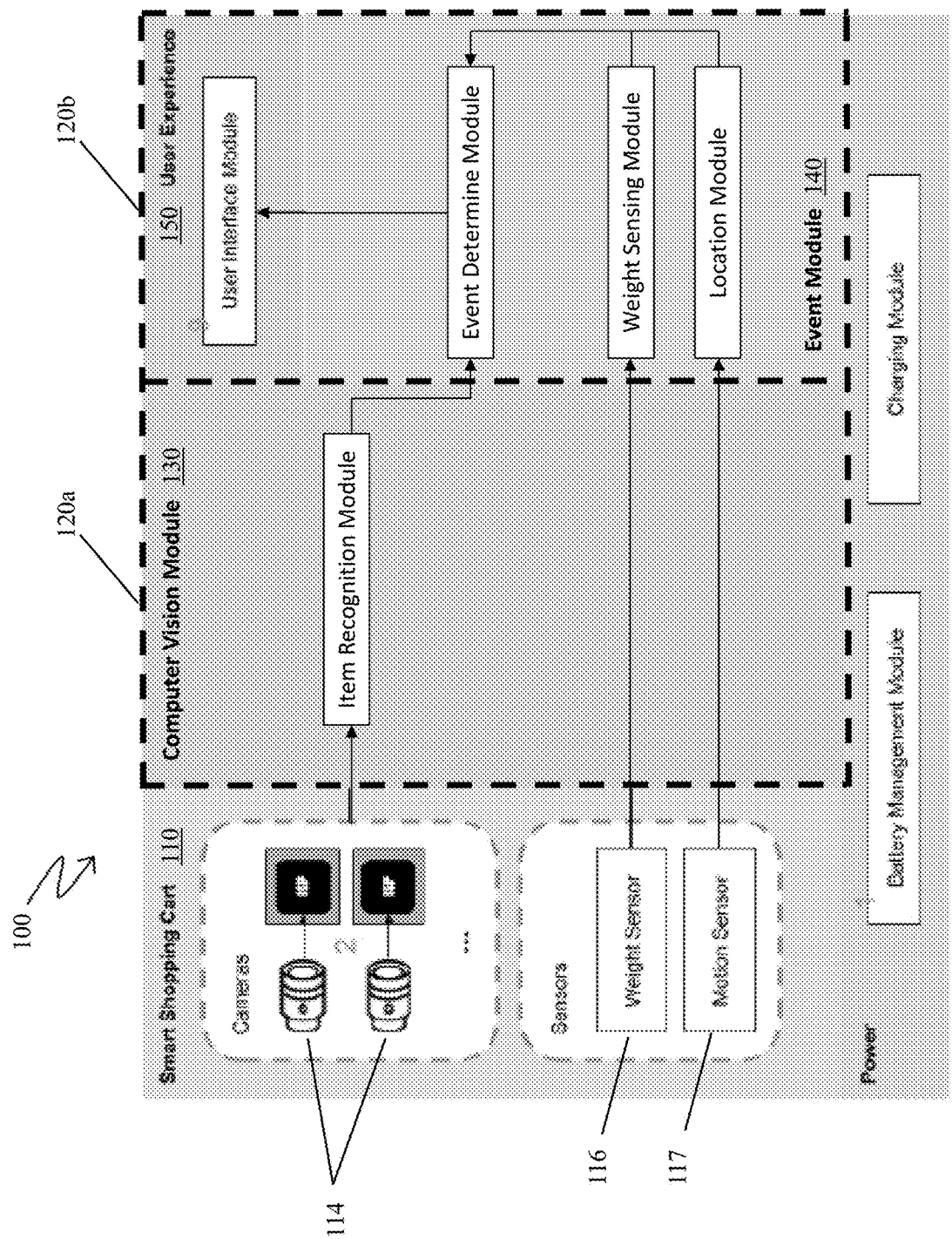
FIG. 3 illustrates various software modules and associated architecture of self-checkout vehicle system in accordance with various embodiments of the present disclosure.

FIG. 2 illustrates a representative embodiment of self-checkout vehicle 110. Generally speaking, self-checkout vehicle 110 may include a shopping cart or other conveyance 112, one or more cameras 114 for capturing an image(s) of merchandise items 10 placed in cart 112 by a shopper, a weight sensor 116 (e.g., load receiver) for weighing merchandise items 10 in cart 112, and a user terminal 118 for displaying shopping-related information to a shopper using self-checkout vehicle 110. Camera(s) 114, in various embodiments, may be pointed inwards towards the cargo area of cart 112 and located such that at least one of the camera(s) will capture an image of identifier 12 on merchandise item 10 as it is placed into cart 112. As configured, shoppers may more casually place merchandise items 10 into cart 112 without the need for awkwardly holding the merchandise item 10 in front of a camera or otherwise having to walk around to the other end/side of cart 112 where, say, the only camera is located. In some embodiments, camera(s) 114 may be positioned and oriented such that weight sensor 16 is within the field of view of at least on of camera(s) 114 which, as later described, can further streamline the process of weighing and identifying item 12 as both functions can be performed without having to move item 12 to accommodate each function separately. In various embodiments, self-checkout vehicle 110 may further include one or more motion sensor(s) 117 to detect when a merchandise item 10 is being placed into or removed from cart 112. Further representative embodiments of self-checkout vehicle 110 and certain components thereof are shown and described in U.S. Patent Application Publication 2019/0034897A1 entitled Self-Checkout Anti-Theft Vehicle Systems and Methods filed Apr. 18, 2018; U.S. Pat. No. 10,745,039 entitled "Accurate Weight Measurement System and Method Operable with a Movable Device" issued Aug. 18, 2020; and U.S. Patent Application Publication 2020/0151692A1 entitled "Systems and Methods for Training Data Generation for Object Identification and Self-Checkout Anti-Theft" filed Jan. 10, 2020; each of which is incorporated by reference herein in its entirety for all purposes.

System 100, in various embodiments, may comprise a self-checkout vehicle having at least one load receiver mounted in the self-checkout vehicle and configured to measure a weight of a merchandise item selected by a shopper operating the self-checkout vehicle when the selected merchandise item is placed in the self-checkout vehicle, and one or more cameras positioned and oriented on the self-checkout vehicle such that its field of view comprises at least one of the load receiver(s), wherein the one or more cameras are configured to capture one or more images of the selected merchandise item on the at least one load receiver. As configured, processor(s) may be adapted to obtain computer-executable instructions stored on a non-transitory medium that, when executed by the at least one processor, cause processor(s) to identify, from the image(s) using a computer vision technique, the selected merchandise item based on an identifier affixed to the selected merchandise item without having to separately weigh item 10 at another location in cart 110 or elsewhere.

FIG. 3 illustrates various software modules and associated architecture of self-checkout vehicle system 100 in accordance with various embodiments of the present disclosure. Generally speaking, self-checkout vehicle system 100 may include processor(s) 120 configured with a computer vision module 130 for identifying merchandise item 10, an event module 140 for performing various functions associated with weighing and determining the cost of merchandise item 10, and a user experience module 150 for presenting shopping-related information to the shopper on display terminal 118.

Computer Vision Module 130

Computer vision module 130, in various embodiments, may include any computer module suitable for identifying a merchandise item 10 in an image(s) captured by camera(s) 114. In various embodiments, computer vision module 130 may be configured to identify merchandise item 10 by at least in part locating and reading a merchandise item identifier 12 affixed to the selected merchandise item 10. For example, in an embodiment, computer vision module 130 may be configured to localize a portion of the image containing identifier 12 and apply an optical character recognition (OCR) technique to the localized portion of the image containing identifier 12 to identify text contained in or otherwise defining all or a portion of identifier 12. Given that identifier 12 may not be oriented right-side-up or in another orientation suitable for performing OCR techniques, in various embodiments, computer vision module 130 may be configured to (a) identify a probabilistic orientation of identifier 12, (b) determine, based on the probabilistic orientation, a degree by which to rotate identifier 12 in order to orient identifier 12 in the predetermined orientation, and (c) rotate the image of identifier 12 by the determined degree. Rotating identifier 12 by the determined degree, in an embodiment, may permit the selected merchandise item 10 to be placed in the self-checkout vehicle 110 with identifier 12 in any orientation Additionally or alternatively, computer vision module 130 may determine an item category (e.g., produce, or more specifically, a general type of produce such as a tomato) of the selected merchandise item 10, and in some embodiments, compare identifier 12 and the item category identified in each respective image to determine the most likely identification of the merchandise item 10.

Additionally or alternatively, computer vision module 130, in some embodiments, may comprise one or more aspects of computer vision system 200 of the present disclosure, as later described in more detail.

Event Module 140

Event module 140, in various embodiments, may include any computer module suitable for determining when an event of interest is occurring and performing various functions associated with the event. Representative events may include, without limitation, detecting that the shopper is putting in or removing a merchandise item 10 from self-checkout vehicle 110. Event module 140, in various embodiments, may include a location module configured to detect where the self-checkout vehicle is located in the building. By knowing the location of the self-checkout vehicle (e.g., the current shopping section and/or aisle), the system is able to compare the location of the recognized merchandise with its assigned location within the building, with a match further improving the confidence level of the recognized merchandise, as described in more detail herein.

Event module 140, in some embodiments, may be configured to detect when a merchandise item 10 is placed in or removed from self-checkout vehicle 110 in various ways. In one example, motion sensor(s) 117 may detect motion within self-checkout vehicle 110 that is indicative of a merchandise item being placed in or removed. In an embodiment, multiple sensors 117 positioned in a vertical plane may be configured to distinguish between situations where an item is placed in versus removed from self-checkout vehicle 110 by monitoring a sequence in which the various motion sensors 117 detect motion. For example, if motion is first detected by a motion sensor 117 situated near the top of self-checkout vehicle 110 followed by detection by a motion sensor 117 situated near the middle or bottom of self-checkout vehicle 110, event module 140 may infer that a merchandise item 10 is being placed into self-checkout vehicle 110, and vice versa. The event module, in various embodiments, may then receive the location of the self-checkout vehicle 110 from the location module, and compare the expected location of the detected merchandise item 10 with the scanned location. If the location matches, event module may execute an add event that includes adding the merchandise item 10 to a list of other merchandise items previously detected and present in the self-checkout vehicle 10. If the location does not match, the system may prompt the user for confirmation, and add the merchandise item 10 to the list once confirmation is received, or delete the item from memory if the system has identified the merchandise item incorrectly according to some embodiments. It should be understood that a similar process could be performed using camera(s) 114—that is, event module 140 may be configured to detect vertical movement of a merchandise item 10 in self-checkout vehicle 110 by processing a series of images (or video) captured by camera(s) 114 in which the item is sequentially higher and higher. In an embodiment, event module 140 may be configured to make such a determination when item 10 reaches a predetermined location threshold (e.g., a certain distance above the bottom of cart 110). In yet another embodiment, event module 140 may be configured to detect vertical movement of a merchandise item 10 in self-checkout vehicle 110 by processing a series of images (or video) captured by camera(s) 114 to detect the absence of a merchandise item 10 in an image captured by the one or more camera(s) 114 when that merchandise item 10 was previously present in an image previously captured by the one or more camera(s) 114. Event module 140, in such an embodiment, could further compare a first weight measurement captured prior to detecting the absence of the merchandise item 10 with a second weight measurement captured at or after detecting the absence of the merchandise item 10, and determining that the merchandise item 10 was removed if a difference in the first weight measurement and the second weight measurement corresponds with the measured weight of the selected merchandise item 10 when originally placed in the self-checkout vehicle 110. In other words, event module 140 can use the weight in cart 110 to validate what camera(s) 114 considered possible removal of merchandise item 110, as later described. In each of the previously described embodiments, the item recognition module could be utilized to identify the merchandise item 10 whose removal was detected, either by identifying the item 10 itself as it is being removed or by identifying the item 10 based on previously-captured images of items 10 as they sit in cart 110 prior to detecting the absence of the particular item 10.

Additionally or alternatively, event module 140 may monitor weight measurements provided by weight sensor(s) 116 for a change in weight that may be indicative of a merchandise item being placed in or removed from self-checkout vehicle 110. For example, if an increase in weight is detected, event module 140 may infer that a merchandise item 10 has been placed in self-checkout vehicle 110, and vice versa. In an embodiment, event module 140 may consider such inputs from both weight sensor(s) 116 and motion sensor(s) 117 in determining whether a merchandise item has been added to or removed from self-checkout vehicle 110. For example, event module 140, may be configured to monitor weight measurements upon detecting motion via motion sensor(s) 116 and determine that a merchandise item has been added or removed if there is a corresponding change in weight. By monitoring first for motion, this may help avoid false event detections such as one in which the weight measurements changed due to an item rolling around in self-checkout vehicle 110. Additionally or alternatively, event module 140 may be configured to consider input from computer vision module 130 in determining whether a merchandise item 10 has been added to or removed from self-checkout vehicle 110. For example, in one embodiment, event module 140 may simply consider whether a merchandise item 10 was detected by computer vision module 130, whether such merchandise item 10 was fully identified or if only an item category was determined. By confirming visually that a merchandise item was in fact present above other items at the bottom of self-checkout vehicle 110, event module 140 may infer than a merchandise item 10 was added or removed. This consideration may be combined in like manner with one or more of the aforementioned considerations (e.g., motion detection, weight change) in identifying whether a merchandise item 10 has been added or removed from self-checkout vehicle 110.

The location module, in some embodiments, is configured to determine where the self-checkout vehicle 110 is in the store using one or more sensors including the motion sensor 117. The location module provides the self-checkout vehicle 110 location and/or coordinates to the event determine module. Once the event determine module receives the location of the detected merchandise item 10, it will execute one or more of the steps of: (1) grabbing all possible merchandise according to the location to verify the recognition result; and (2) displaying on the user interface: (a) a successful add event if recognized result is supposed to be that location, or (b) a pending add event which requires the user to confirm the accuracy of the result.

Event module 140, in various embodiments, may additionally be configured to receive information regarding the identity of the merchandise item 10 from computer vision module 130 and determine a cost of merchandise item 10 based on the received identity and (optionally) the weight of merchandise item 10 as measured by weight sensor(s) 116. For example, event module 140 may look up a price of the merchandise item 10 (whether such prices are stored locally in onboard memory or remotely in remote memory) based on the identification provided by computer vision module 130 and, if the price is provided as a function of weight, calculate the price by multiplying the cost by the measured weight. If the price is provided as a fixed price (i.e., independent of weight), event module 140 may simply identify the price of the merchandise item 10 as the lookup price. Additionally or alternatively, in embodiments where the price is fixed price per item, computer vision module 130 may be configured to identify when multiple merchandise items 10 are added at the same time (e.g., three peaches are added, rather than one at a time), in which case event determination module 140 may calculate the cost of the added merchandise items by multiplying the per unit cost by the number of merchandise items 10 identified by computer vision module 140 as having been added. Of course, similar approaches may be used to determine the cost reductions when merchandise items 10 are instead removed from self-checkout vehicle 110.

User Experience Module 150

User experience module 150, in various embodiments, may be configured for presenting shopping-related information to the shopper on display terminal 118. For example, in an embodiment, user experience module 150 may process a running tab of merchandise items 10 determined to be in self-checkout vehicle 110. Upon receiving information from event determination module 140 regarding whether a merchandise item 10 was added or removed from self-checkout vehicle 110, user experience module 150 may cause display terminal 118 notify the shopper of the detected addition or removal of a merchandise item 10 from self-checkout vehicle 110 and, in an embodiment, display the corresponding charge being added to or removed from the running tab. Additionally or alternatively, user experience module 150 may be configured to provide the shopper with recommendations, coupons, or other suggestions based on the merchandise items 10 added to self-checkout vehicle 110. For example, user experience module 150 may be configured to identify, from a database of merchandise items, one or more additional merchandise items the shopper may be interested in based on what other shoppers have historically purchased along with the selected merchandise item 10—that is, e.g., recommend the shopper purchase syrup when he/she adds pancake mix to self-checkout vehicle 110. In an embodiment, user experience module 150 may further identify where the recommended item is located in the store and provide the shopper with instructions for navigating to such location. In some embodiments, display 118 may include a user interface (e.g., touchscreen) such that the shopper can interact with features provided by user experience module 150. In yet another embodiment, display terminal 118 could instead be an electronic device provided by the shopper (e.g., a tablet or smart phone), and to which event module 150 pairs (e.g., via Bluetooth) such that the shopper need not touch for sanitary reasons a display used by previous shoppers.

Computer Vision System 200

Figure 4:
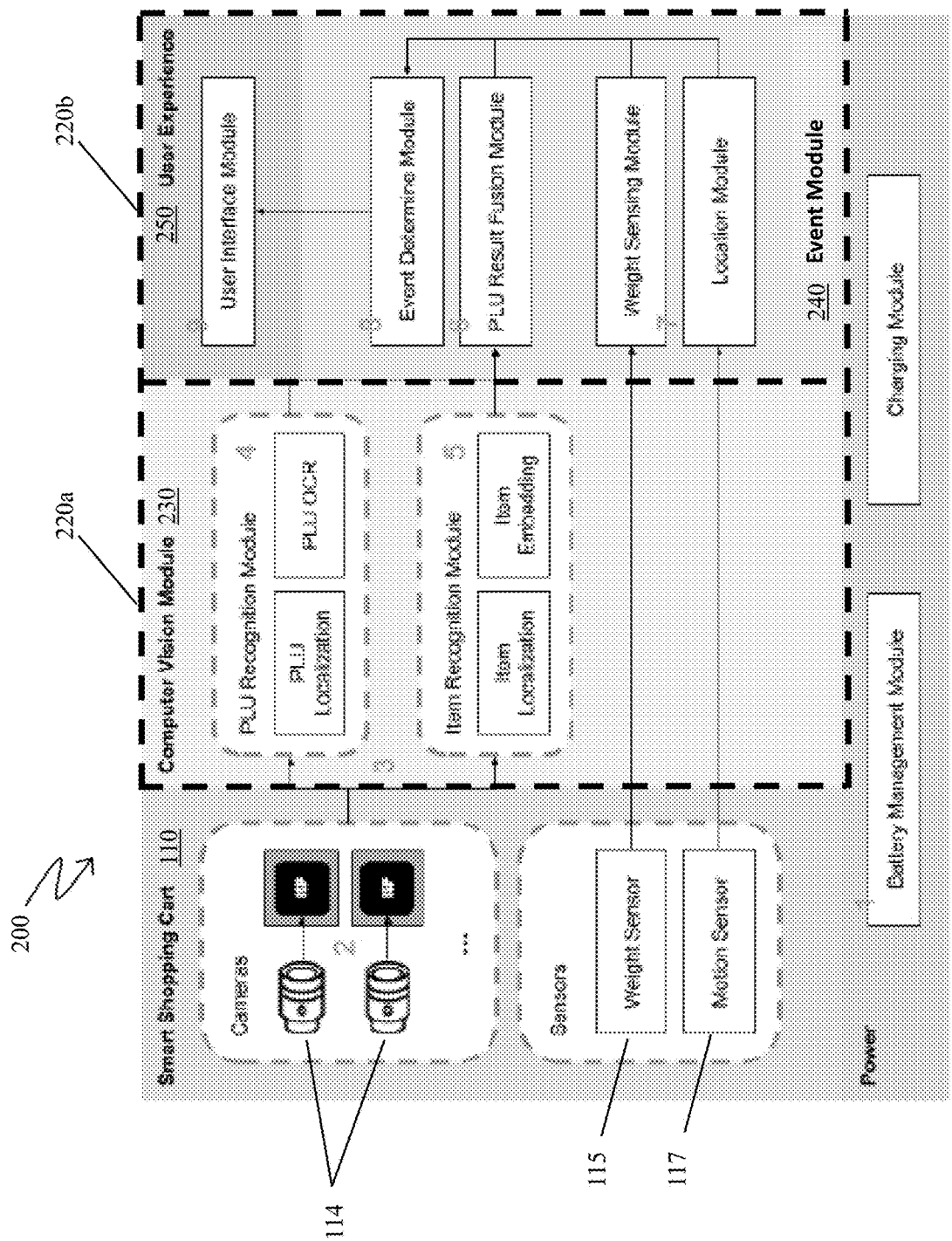
FIG. 4 illustrates various software modules and associated architecture of a computer vision system in accordance with various embodiments of the present disclosure.

FIG. 4 illustrates various software modules and associated architecture of computer vision system 200 in accordance with various embodiments of the present disclosure. Generally speaking, computer vision system 200 may include processor(s) 220 configured with a computer vision module 230 for identifying merchandise item 10, an event module 240 for performing various functions associated with weighing and determining the cost of merchandise item 10, and a user experience module 250 for presenting shopping-related information to the shopper on display terminal 118. In various embodiments, event module 240 and user experience module 250 may be substantially similar to event module 140 and user experience module 150, and computer vision system 230, in some embodiments, may comprise one or more aspects of computer vision module 130 of the present disclosure. Notwithstanding, computer vision system 200 of the present disclosure may be configured with a workflow for more accurately identifying selected merchandise item 10 based on (a) locating and reading a identifier affixed to the selected merchandise item 10, (b) determining an item category (e.g., produce) of the selected merchandise item 10, and fusing (a) and (b) according to various methods further described herein to provide an accurate and frustration-free shopping experience.

A non-limiting example workflow begins with the computer vision system 200 booting up processor(s) 220 containing the computer vision module 230, event module 240, and the user experience module 250, as well as booting one or more electronic devices such as camera(s) 114, weight sensor(s) 116, motion sensor(s) 117, and image signature processors (ISPs). In various embodiments, the ISP is configured to execute simple image processing including denoising, auto white balance, as well any conventional operations associated with signature image processing. The camera(s) 114 generate image streams of merchandise items 10 which are processed by the ISP by denoising, resizing and cropping to reduce data transfer cost. The computer vision module fetches merchandise data which has been processed by ISP, then feeds the merchandise data into two algorithm pipelines—the identifier recognition module and the item recognition module. The item recognition module is configured to identify the item category by using one or more images of the merchandise item 10. After the merchandise item 10 is detected, a feature extraction network module is implemented to extract feature representations containing information such as one or more of color, shape, texture, and/or any other physical attribute than can be determined by an image. A feature matching mechanism module is then implemented to calculate distances between extracted feature representations and compare them to features in a gallery database. The item category is defined by the minimum distance. One or more steps implemented by the system for identifying an item category of the selected merchandise 10 comprises the processor(s): localizing a portion of the image containing the selected merchandise item 10; generating a feature representation of the selected merchandise item 10 depicted in the localized portion of the image; and comparing the feature representation of the selected merchandise item 10 with feature representations of a plurality of available merchandises in a dataset to identify the available merchandise having a feature representation most similar to that of the selected merchandise item 10.

The identifier recognition module identifies merchandise items 10 by recognizing one or more identifiers 12 on the merchandise item 10. The identifier recognition module first localizes one or more identifiers 12 in the input frame, then applies an OCR technique to the detected area. In some embodiments, one or more of traditional computer vision (CV) and deep learning (DL) are employed to provide fast inference and accurate text recognition results. After text is recognized, it is queried to an identifier 12 database to get the related item category. The identifier result fusion module takes one or more history frame results from both identifier OCR module and the item recognition module as inputs and uses rules to obtain the most likely result. One or more weight sensors 116 gives real-time weight delta of all the merchandise items 10 in the self-checkout vehicle 110. The price of the merchandise item 10 can then be calculated by the weight delta. The event determining module will combine one or more of the computer vision result, weight changes, and motion data to determine whether the customer intends to put in a merchandise item 10 or remove a merchandise item 10. Once one or more events are determined, the system is configured to display event notification in user interface.

In various non-limiting embodiments, the system may implement one or more of: identifying, in one or more images of a merchandise item 10 selected by a shopper, an identifier 12 affixed to the selected merchandise item 10; identifying, based on at least one of the image(s), an item category of the selected merchandise item 10; and comparing the identifier 12 and item category identified in each respective image to determine the most likely identification of the merchandise item 10. The identifier 12 may include at least one of a price lookup (PLU) code, a numerical code, according to some non-limiting embodiments.

Inference Dataflow

Figure 5:
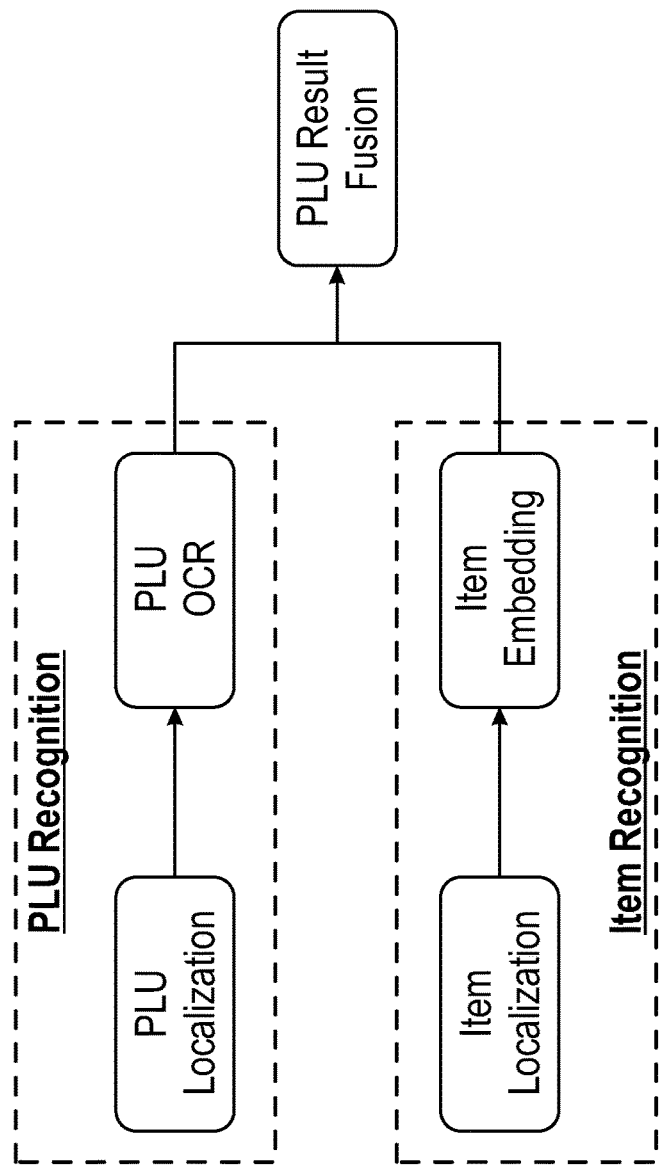
FIG. 5 shows a main inference dataflow in the computer vision module in accordance with an embodiment of the present disclosure.

FIG. 5 shows a main inference dataflow in the computer vision module in accordance with an embodiment of the present disclosure. There are two streams in the inference data flow, which are for identifier 12 recognition and item recognition, respectively. The identifier recognition stream localizes the identifier 12 label and employs OCR to recognize any text (including numbers) in identifier 12 label. The merchandise item category (e.g., produce) is identified using a key-value database once the identifier 12 is recognized according to some embodiments. The item recognition stream detects an merchandise item 10 if it is too far away from camera(s) 114. The item image is fed into an embedding network to generate feature representation of the captured merchandise item 10. In some embodiments, feature representation is a multiple-dimensional vector in float or integer which can be used to identify a category by choosing the minimum distance to each feature vector in a feature dataset and/or called gallery. Output categories in both streams then flow into the identifier result fusion algorithm which is in charge of fusing the results and provide a more reliable and accurate prediction based on experience. In various non-limiting embodiments, the system processor(s) may implement one or more steps of: localizing a portion of the image containing the identifier 12; and applying an optical character recognition technique to the localized portion of the image containing the identifier 12 to identify text defining the identifier 12. The system may also be configured to implement one or more steps including: detecting a location of the identifier 12 in the image; distinguishing, at the detected location, those pixels of the image comprising the identifier 12 from those pixels of the image comprising the selected merchandise; and rotating those pixels of the image comprising the identifier 12 into a predetermined orientation. In some embodiments, the system identifies a probabilistic region in which the identifier 12 is contained and generates a bounding box surrounding the probabilistic region.

Non-Barcode Identifier Localization Module

Figure 6:
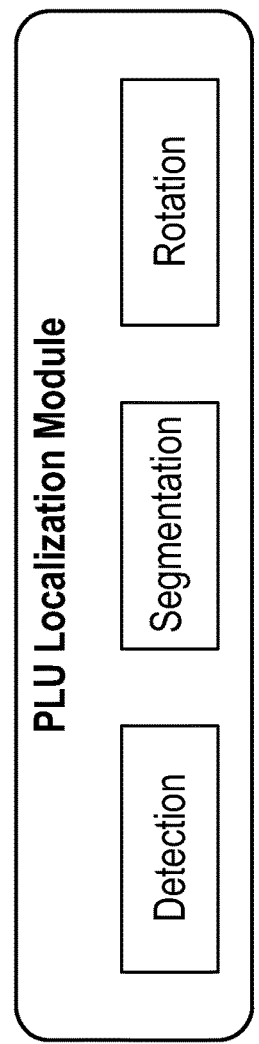
FIG. 6 shows components of the identifier localization module in accordance with some embodiment of the present disclosure.

FIG. 6 shows components of identifier localization module in accordance with some embodiment of the present disclosure. Identifier localization module is a powerful detector with three main goals, which are detection, segmentation and rotation. Detection outputs bounding boxes around the merchandise item 10 and a naive merchandise item category. Segmentation predicts the precise merchandise item pixels in the frame by outputting a mask consisting of 0 and 1. The value 1 represents a merchandise item pixel while 0 represents the background. Rotation outputs rotate the angle of the merchandise item 10 between −180 and 180 degrees. Since the behavior of putting merchandise items 10 into self-checkout vehicle 110 is unpredictable, and the identifier 12 will most likely be rotated in frame, rotation calibration is performed in the localization module.

The system may implement one or more of the following steps when determining and/or implementing rotation: identifying a probabilistic orientation of the identifier 12; determining, based on the probabilistic orientation, a degree by which to rotate the identifier 12 in order to orient the identifier 12 in the predetermined orientation; and rotating the identifier 12 by the determined degree. The system automatically rotating the identifier 12 by the determined degree permits the selected merchandise to be placed in the self-checkout vehicle with the identifier 12 in any orientation.

To distinguishing those pixels of the image comprising the identifier 12 from those pixels of the image comprising the selected merchandise comprises one or more processor executed steps of: generating a naïve item category of the selected merchandise; comparing pixels of the image at the location with pixels associated with the naïve item category; identifying, from the comparison of pixels, those pixels which are dissimilar from the pixels associated with the naïve item category; and identifying the dissimilar pixels as those pixels comprising the identifier 12.

Figure 7:
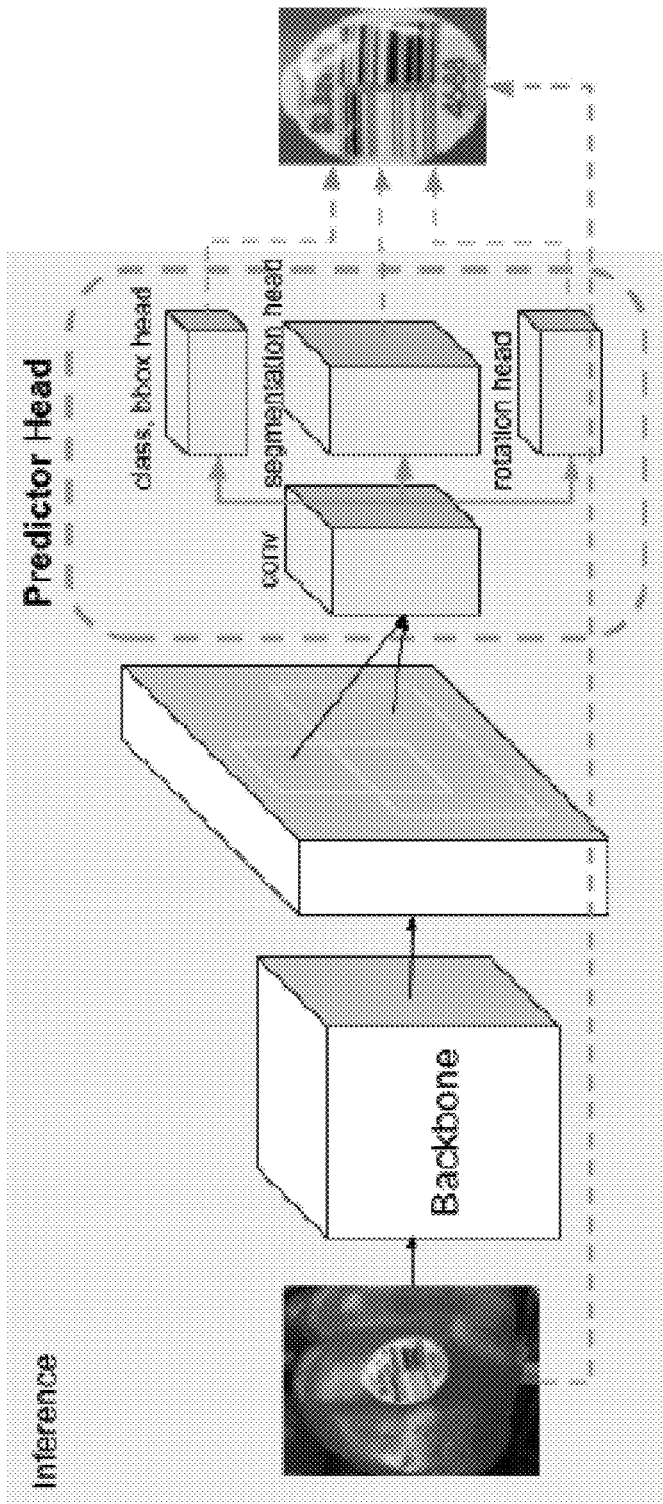
FIG. 7 shows an inference pipeline of the identifier localization module in according to some embodiments.

FIG. 7 shows an inference pipeline of identifier localization module in according to some embodiments. During inference in identifier localization module, each frame is fed into the backbone of the neural network. In some embodiments, a region proposal network (RPN) intermediate layer takes the backbone outputs as inputs and generates probabilistic region proposals. In some embodiments, the RPN includes one or more modifications including, as a non-limiting example, a probabilistic 2-stage detector presented in CenterNet2. Additional convolutions are connected to proposed regions to extract higher-semantic features, which are then fed into three prediction heads, detection, segmentation and/or rotation. Predicted bounding boxes, masks and rotation angle are then applied to original frame to output a cropped, segmented and calibrated image of identifier 12.

Figure 8:
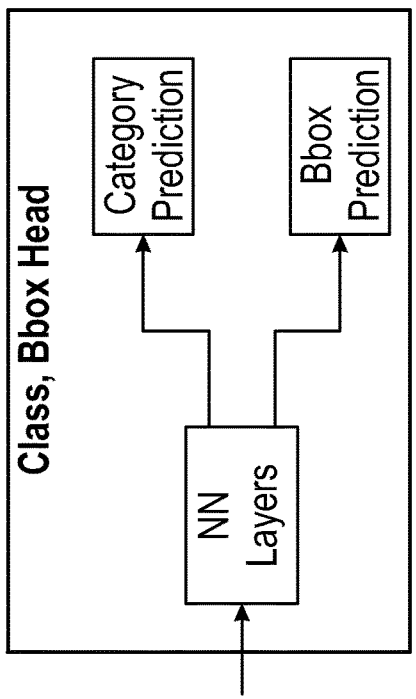
FIG. 8 shows class, bbox head in the identifier localization module in accordance with some embodiments of the present disclosure.

FIG. 8 shows class, bbox head in identifier localization module in accordance with some embodiments of the present disclosure. The purpose of the class, bbox head is to perform detection in the identifier localization module. In some embodiments, the class, bbox head is configured to output a vector containing both a predicted class and a bounding box. After a stack of neural network (NN) layers (e.g., convolutional layers and/or fully-connected layers) are executed, two predictions are generated, which are the category prediction and Bbox prediction. In some embodiments, naive category prediction provides a probability of the given item being a type of merchandise item 10 (e.g., produce) or a background. In some embodiments, a float threshold is also used to determine the merchandise category by eliminating merchandise probability with a value smaller than the float threshold. In some embodiments, the system implements a bounding box prediction which is a regression task that gives predicted location of the merchandise item 10 by its surrounding rectangle coordinates, such as [x1, y1, x2, y2].

During training, the class, bbox head itself is a multi-task learning algorithm. In some embodiments, the head is configured to learn from cross entropy loss from category prediction and a variation of intersect over union (IoU) loss from bbox prediction simultaneously, with constants giving losses different weights, respectively.

$$l_{class,bbox} = l_{category} \in l_{bbox}$$

During inference, in some embodiments, the class, bbox head outputs a vector as prediction, N×(4+1)×C where N represents for number of proposals, 4 is the described rectangle coordinates and 1 is category probability, C is the number of categories including background.

Figure 9:
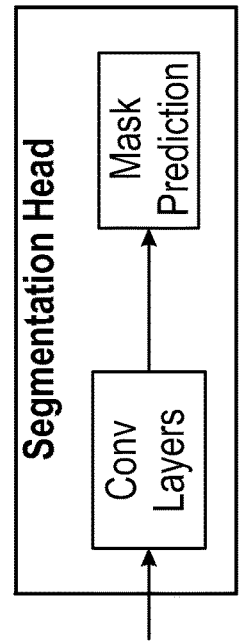
FIG. 9 shows a segmentation head in the identifier localization module in accordance with some embodiments of the present disclosure.

FIG. 9 shows a segmentation head in the identifier localization module in accordance with some embodiments of the present disclosure. The segmentation head only provides a mask prediction which is a mask with shape of [N, h, w, C], where N represents for number of proposals, and h and w are height and width of the proposals after some convolutional layers, and C is the number of categories including background. Each pixel in mask prediction is represented in 0 or 1, with 0 as background and 1 as category. In some embodiments, during training every pixel in mask prediction is compared to ground truth pixel to give a mask loss which will back-propagate to the whole network. During inference, only the predicted category in class, bbox head will be selected according to some embodiments.

Figure 10:
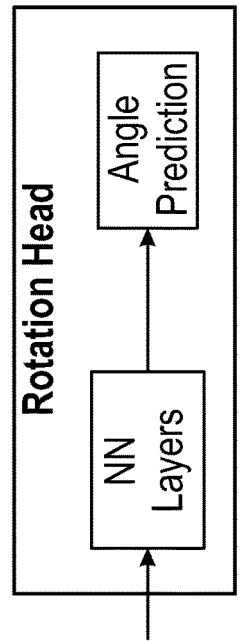
FIG. 10 shows a rotation head in the identifier localization module according to some embodiments of the present disclosure.
Figure 11:
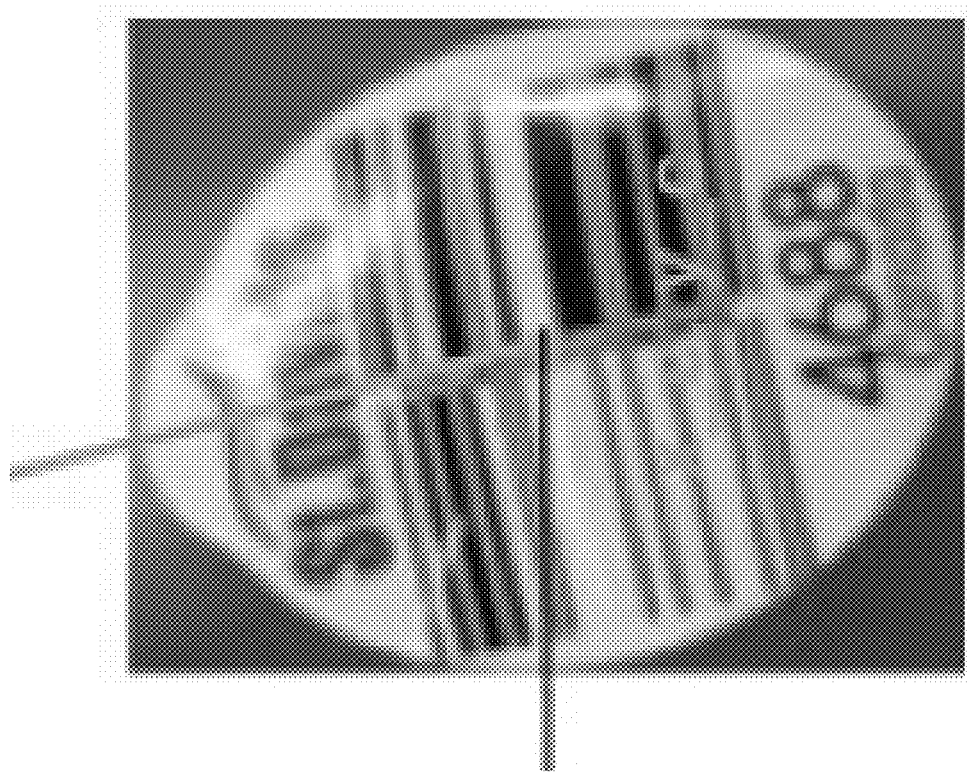
FIG. 11 shows predicting the rotation angle about the center in accordance with an embodiment of the present disclosure.

FIG. 10 shows a rotation head in the identifier localization module according to some embodiments of the present disclosure. Rotation head provides an angle prediction which is the rotation angle in degrees about the center. As shown in FIG. 11, center point of the identifier 12 label is represented by [x_c, y_c] and the angle between the orange line and the black line is the angle prediction according to some embodiments. During training, in some embodiments, angle prediction can be tuned using a regression loss, such as MSE, smooth 11, etc. During inference, all foreground categories shall be rotated using this angle prediction according to some embodiments.

Identifier OCR Module

Figure 12:
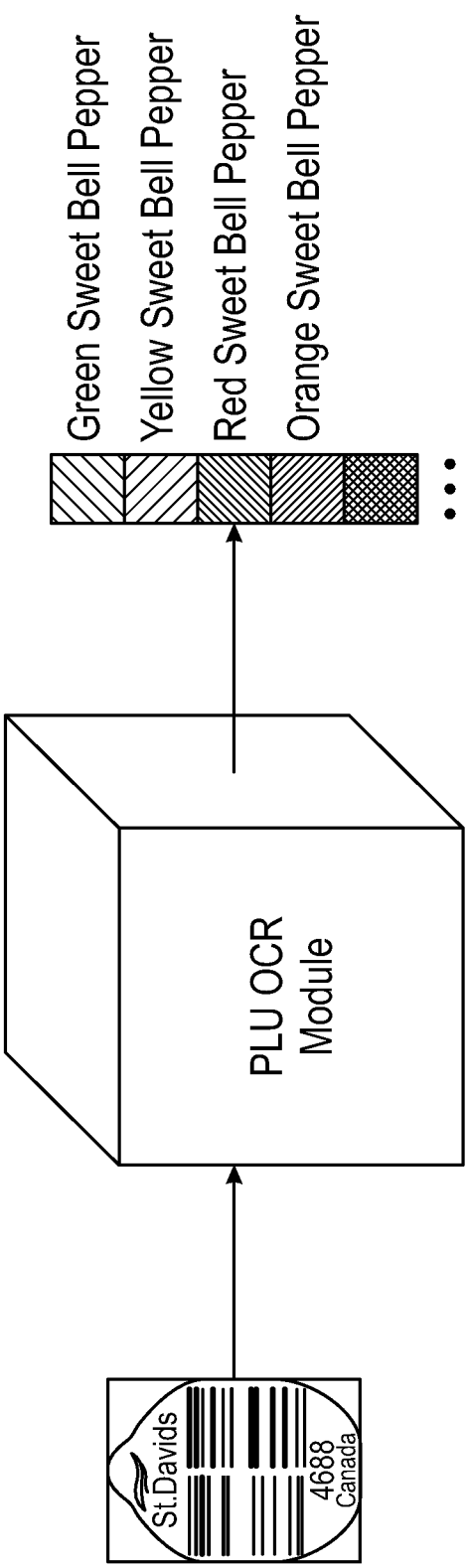
FIG. 12 shows a high-level overview of the identifier OCR module in accordance with some embodiments.

The identifier OCR module takes outputs from identifier localization module, which are a batch of cropped identifier images. The competent OCR algorithm pipeline can directly turn input images into output categories. FIG. 12 shows a high-level overview of identifier OCR module in accordance with some embodiments. There are basically two approaches which are capable of producing the similar OCR result, which are end-to-end OCR approach and traditional computer vision (CV)+machine learning (ML) approach. End-to-end OCR approach embraces deep learning in the whole pipeline. The end-to-end OCR dataflow has the advantage of being more scalable compared to traditional CV+ML approach.

End-to-End OCR Dataflow

Figure 13:
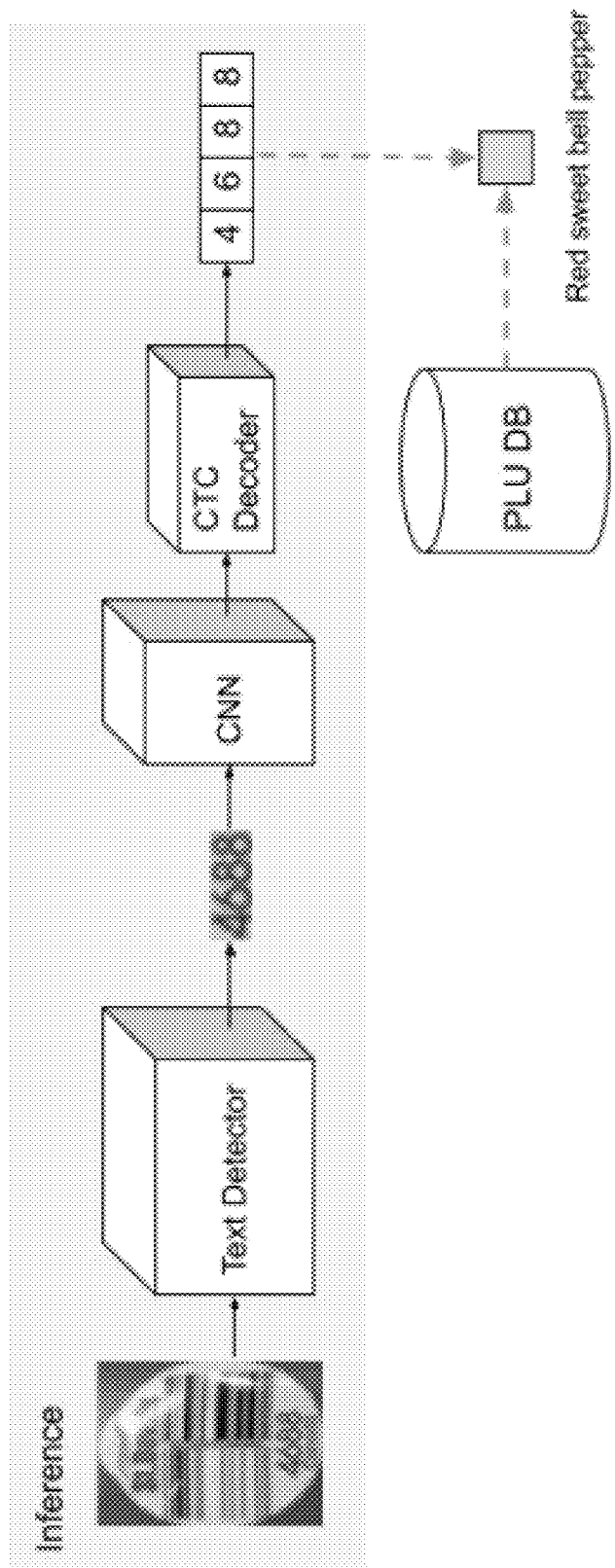
FIG. 13 shows end-to-end OCR dataflow in the identifier OCR module in accordance with some embodiments.

In end-to-end OCR dataflow, identifier images are fed into a text detector to localize text in the identifier image. In some embodiments, the text detector not only detects text bounding boxes, but also orients the detected bounding boxes. Detected text bounding boxes are then fed into a convolutional neural network (CNN) followed by a connectionist temporal classification (CTC) decoder according to some embodiments. After the texts is decoded, they are queried to an identifier 12 database to determine the correct category of the merchandise item 10. FIG. 13 shows end-to-end OCR dataflow in the identifier OCR module in accordance with some embodiments. In some embodiments the system is configured to execute one or more steps including: localizing, using a text detector, text in the localized portion of the image containing the identifier 12; rotating the localized text to a predetermined orientation; extracting one or more features of the text using a convolutional neural network (CNN); generating, using a connectionist temporal classification (CTC), an output distribution over all possible text outputs. The steps may also include inferring, from the output distribution, a likely output and identifying the text defining the identifier 12 by: collapsing, in the likely output, any repeats; and removing, in the likely output, any blank symbols.

Text Detection

Figure 14:
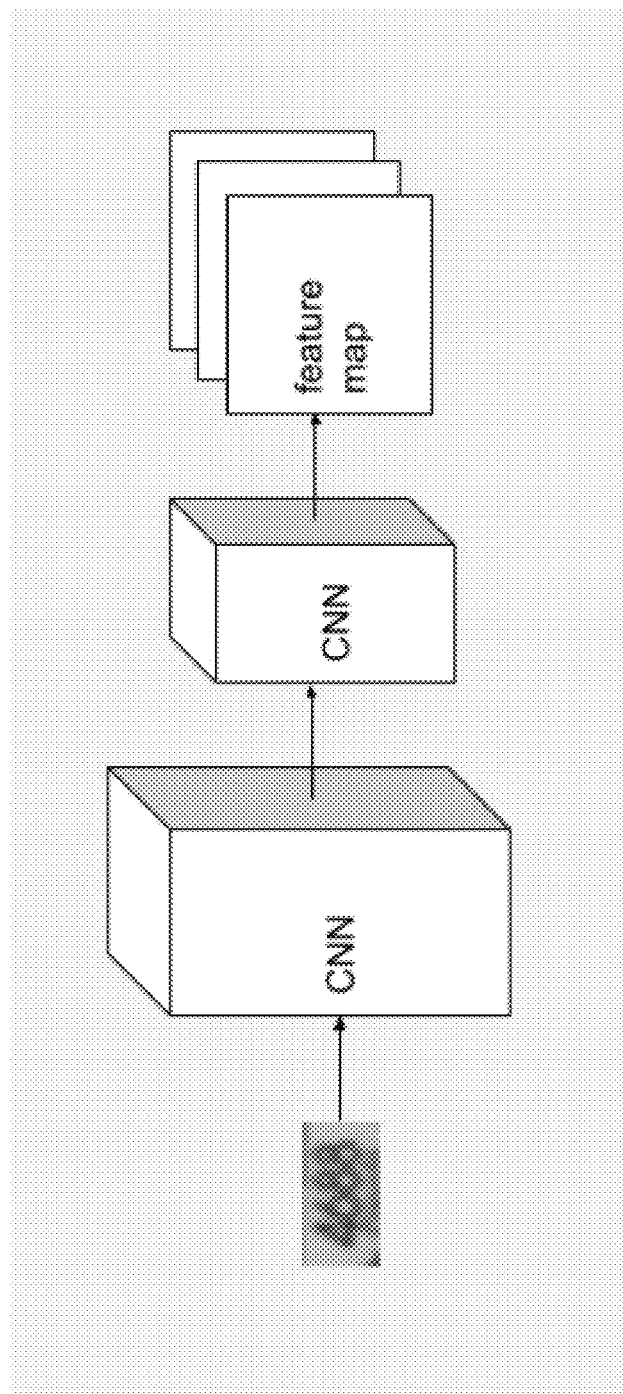
FIG. 14 shows a CNN backbone used by the system to extract text image features according to some embodiments.

From detected text bounding boxes a CNN+CTC Decoder is designed to predict the exact text content (e.g., numbers). For a visual recognition task, a CNN is used due to its good tolerance on distortions and noises which are often cases in identifier images. FIG. 14 shows a CNN backbone used by the system to extract text image features according to some embodiments. CNN also provides the ability to extract high level features: those bounding boxed text images will go through several convolutional layers with pooling padding and some activations to get final calculated feature maps with shape of [b, h', w', c], where b is batch size of inputs, h', w' denotes the height and width after some striding and pooling operations in previous convolutional neural network, and c is the number of output channels. In some embodiments, the CNN is a regular backbone (e.g. resnet50, shufflenet v2, mobilenet v3) which turns a batch of images into a set of high level feature maps. In some embodiments, the extracted feature maps are sent to CTC Decoder as high level semantic features for further prediction.

Figure 15:
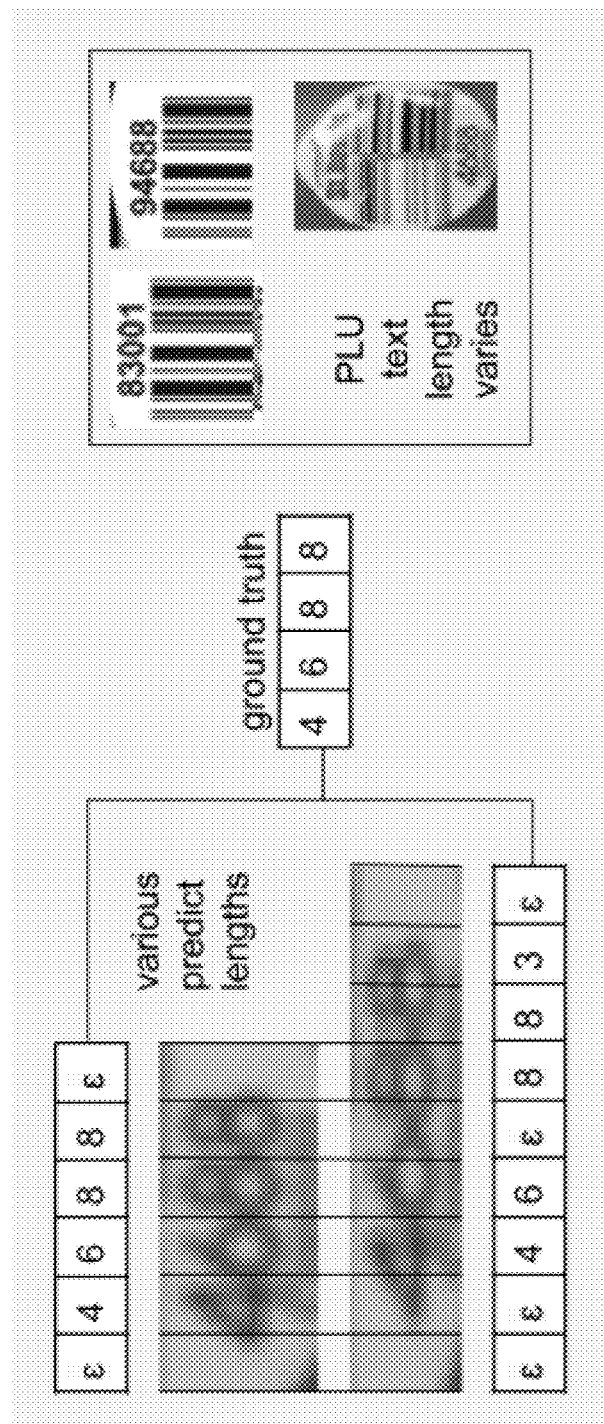
FIG. 15 illustrates CTC implementation by the system according to some embodiments.
Figure 16:
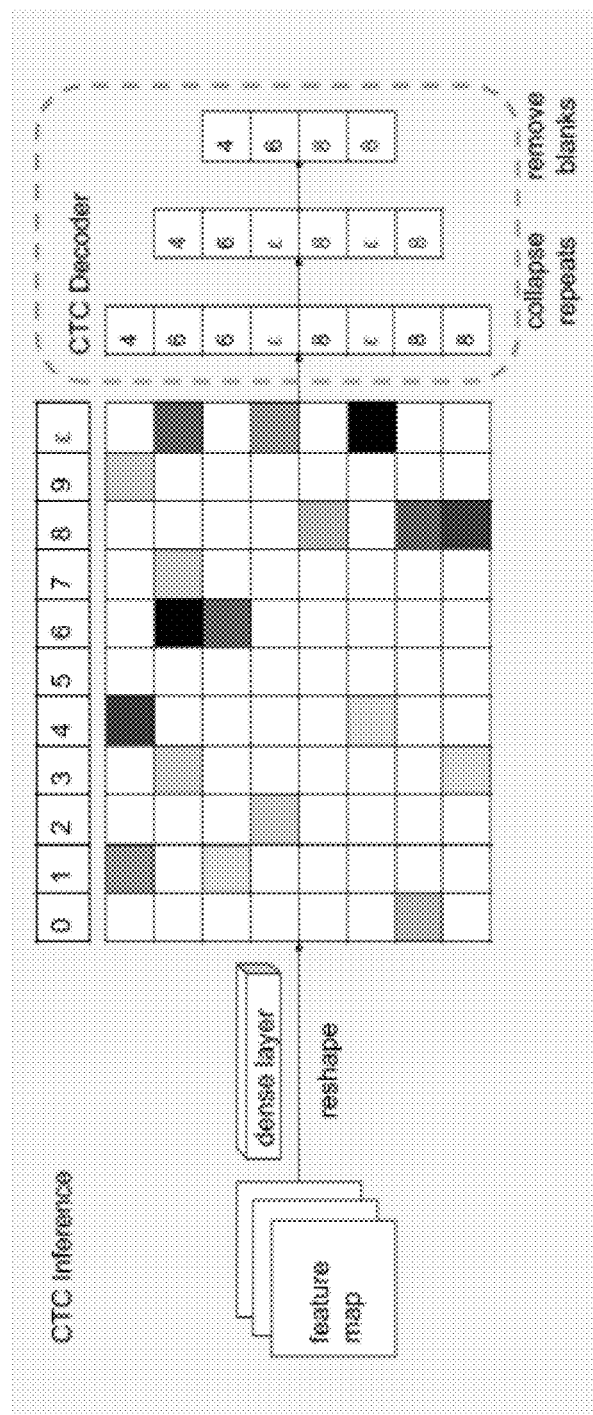
FIG. 16 depicts CTC in inference according to some embodiments.

Since text area size in image varies and identifier text length varies the system is configured to implement a connectionist temporal classification (CTC) decoder to avoid the problem of lacking an accurate alignment of image and text content in some embodiments. FIG. 15 illustrates CTC implementation by the system according to some embodiments. For a given bounding boxed text image, the CTC algorithm gives an output distribution over all possible text outputs instead of directly predicting the numbers since traditional decoders can only predict a fixed length output. In some embodiments, the system is configured to use this distribution either to infer a likely output or to assess the probability of a given output. FIG. 16 depicts CTC in inference according to some embodiments. The feature maps generated by the previous convolutional neural network are reshaped and fed into a dense layer. An output of dense layer is then be reshaped back to [b, t, C], where b is the batch size of inputs, t is pre-defined CTC timestamp (e.g., 8 in FIG. 16), and C is the number of categories (possible digits and a blank symbol, e.g., 11 in FIG. 16). The dense layer output which gives the probabilistic distribution of each character at each CTC timestamp is then decoded by a CTC decoder.

During inference, a CTC decoder takes the most likely output from CTC predicted distribution with collapsing repeats and by removing blank symbols gives the text prediction, which will finally be sent to identifier 12 database and turned into output categories.

The CTC decoder performs two functions according to various embodiments: (1) calculate distribution (scores) over all or some possible form at each timestamp; and (2) merge the same sequence in different form (e.g. 466c8c88 and 44668c88 both output 4688). In various embodiments, the system is configured to assess, from the output distribution, the probability of a given output, and identify the text defining the identifier 12 from the output having the highest probability.

Figure 17:
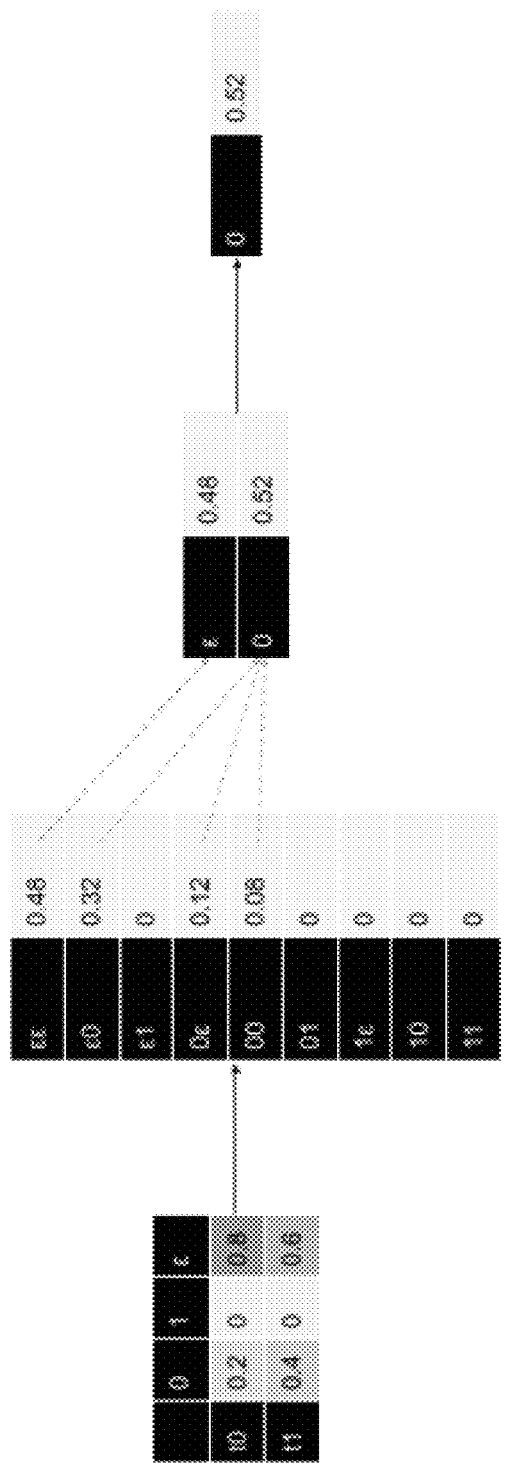
FIG. 17 shows an example of CTC decoding according to some embodiments.
Figure 18:
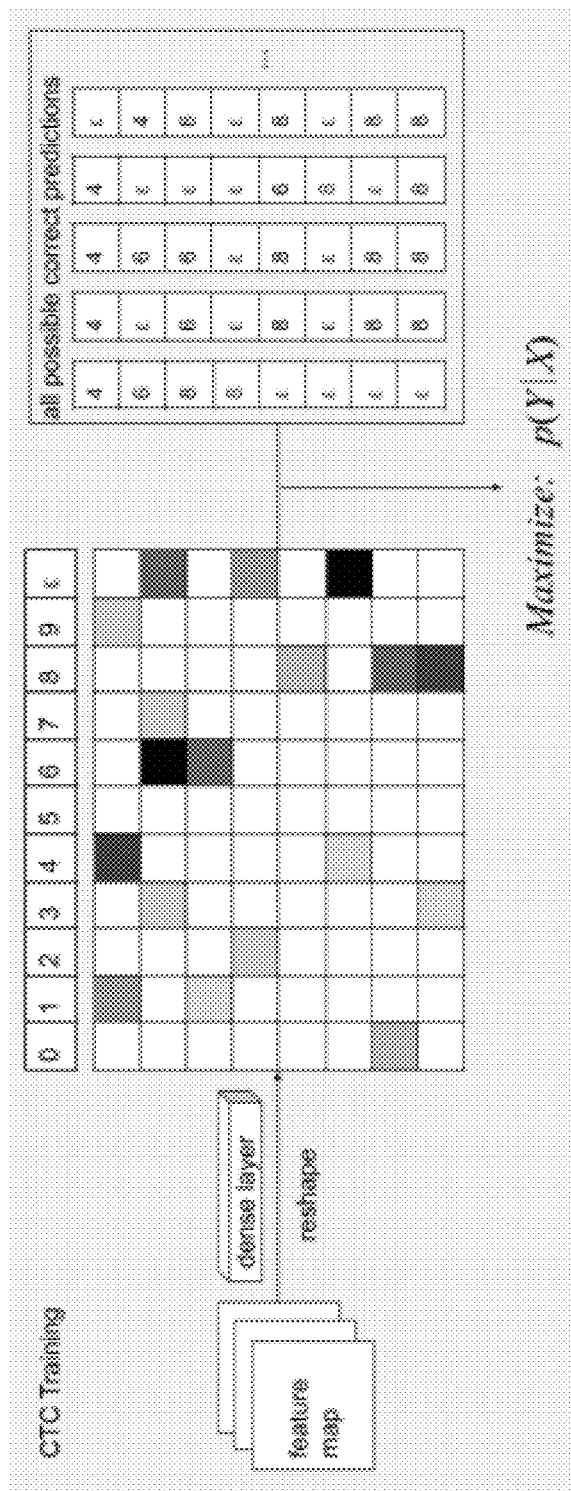
FIG. 18 shows CTC in training in accordance with some embodiments of the present disclosure.

According to various embodiments there are different implementations of CTC decoder: (1) a CTC beam decoder pruning search at each timestamp to top B possible form as beam candidates; and (2) a CTC greedy decoder taking the maximum probabilistic distribution at each timestamp, then collapsing repeats and removing blanks. After CTC decoding, the sequence with the highest score will be selected (e.g., 4688 in FIG. 16). FIG. 17 shows an example of CTC decoding according to some embodiments. By having 3 categories (0, 1 and blank symbol c) and 2 timestamps: (1) all or some possible text outputs are derived with score; (2) the same sequence is merged and the score is summed up after collapsing repeats and removing blanks in text outputs (ε0, 0ε and 00 can all be converted into 0); and (3) the sequence with the highest score is selected. FIG. 18 shows CTC in training. During training, the system needs to maximize the possibility of the input assigning to the right answer which formally denotes as p(Y|X),X stands for the input image, Y for ground truth. For a training set D, the model's parameters are tuned to minimize the negative log-likelihood:

$$\sum_{(x,Y)\in D} -\log p(Y|X)$$

Traditional CV+ML OCR Dataflow

Figure 19:
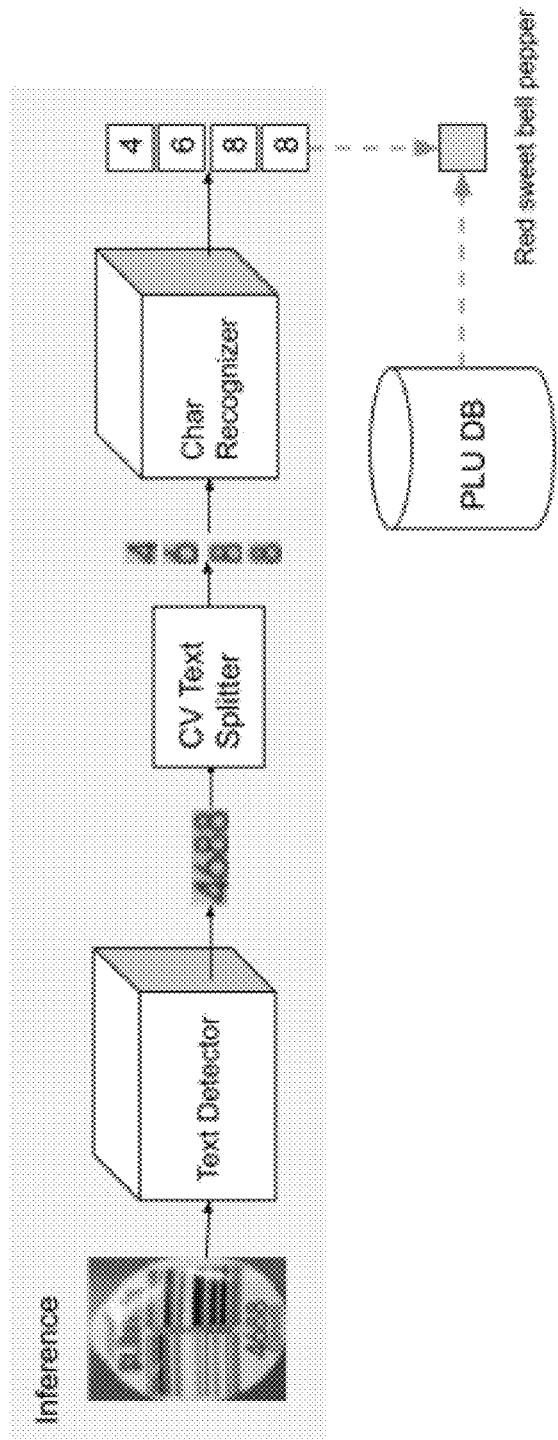
FIG. 19 illustrates a traditional CV+ML OCR dataflow in the identifier OCR module according to some embodiments.

Traditional CV+ML OCR approach uses traditional CV technique to split text into characters and uses a machine learning classifier to recognize each character. FIG. 19 illustrates a traditional CV+ML OCR dataflow in identifier OCR module according to some embodiments. In traditional CV+ML OCR dataflow, identifier images are first fed into a text detector to localize text in an identifier image. The text Detector not only detects text bounding boxes, but also orients the detected bounding boxes. Then a traditional computer vision text splitter splits characters in the text by using image binarizing and contour finding. All single characters are then formed as a batch and inputted into a character (char) recognizer. The char recognizer can be either a deep learning (DL) classifier or ML classifier such as a support vector machine (SVM), Random Forest, KNN (K-Nearest Neighbors), etc. Recognized chars are then sequenced as inputs to form identifier text. After texts are decoded, they are queried to an identifier database to find out the correct category of the merchandise item 10. A benefit of the traditional CV+ML OCR dataflow is that it is faster than an end-to-end deep learning approach. According to various embodiments they system is configured to implement one or more steps that include: localizing, using a text detector, text in the localized portion of the image containing the identifier 12; rotating the localized text to a predetermined orientation; splitting characters in the text using image binarizing and contour finding techniques; evaluating a batch of the characters using either a deep learning classifier or a machine learning classifier to recognize each character; and sequencing the recognized characters.

Item Embedding Module

Figure 20:
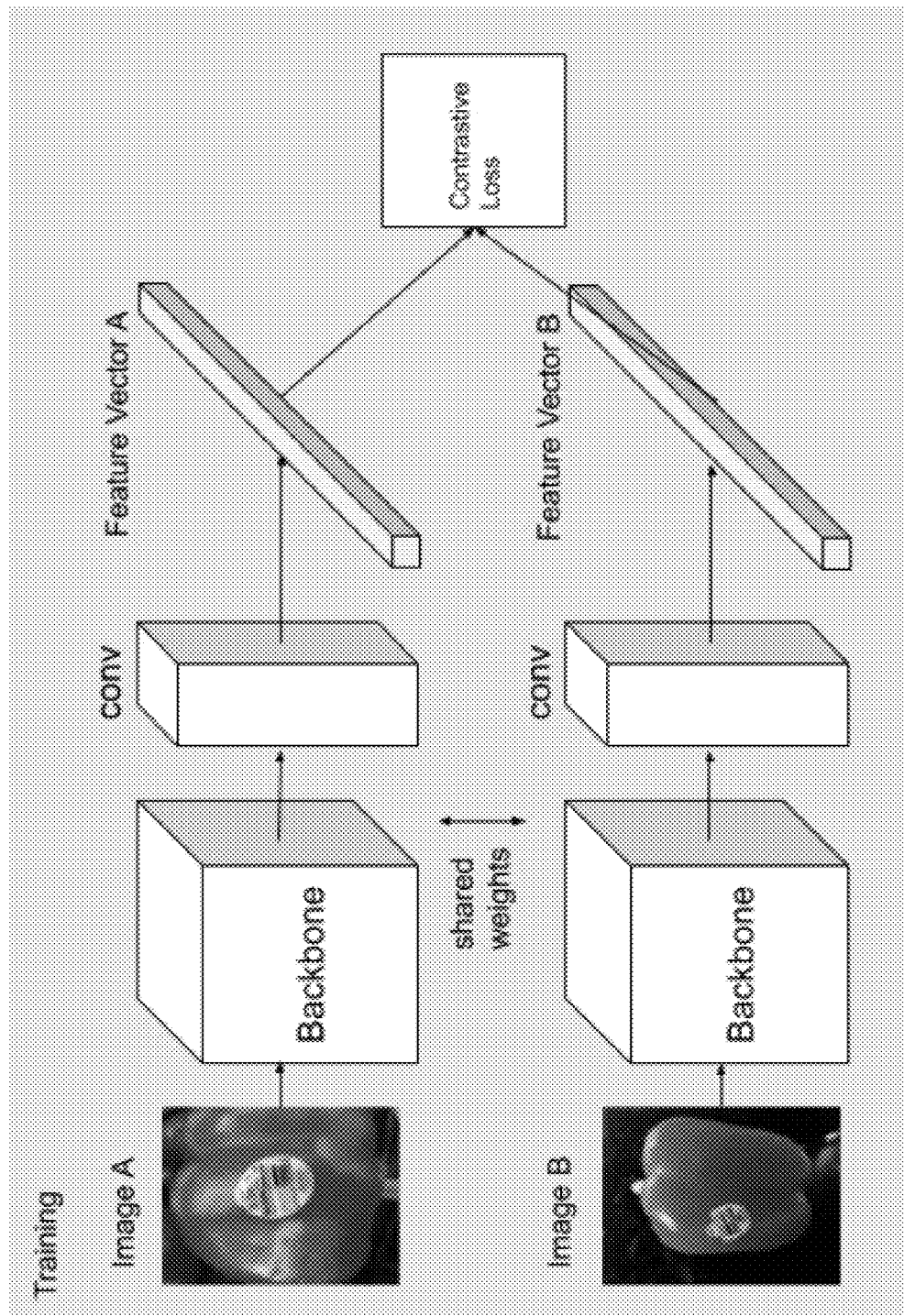
FIG. 20 depicts a training flow of the item embedding module according to various embodiments of the disclosure.

The item embedding module aims to provide discriminative feature representation according to each merchandise item 10. FIG. 20 depicts a training flow of the item embedding module according to various embodiments of the disclosure. To make feature representation more discriminative, a siamese network is employed in training flow. The siamese network takes a pair of images as inputs and extracts a feature representation of each.

Each feature representation used by the system is a multiple-dimensional feature vector. Both feature vectors are used to calculate a contrastive loss. Loss is back-propagated in both networks with shared weights.

Figure 21:
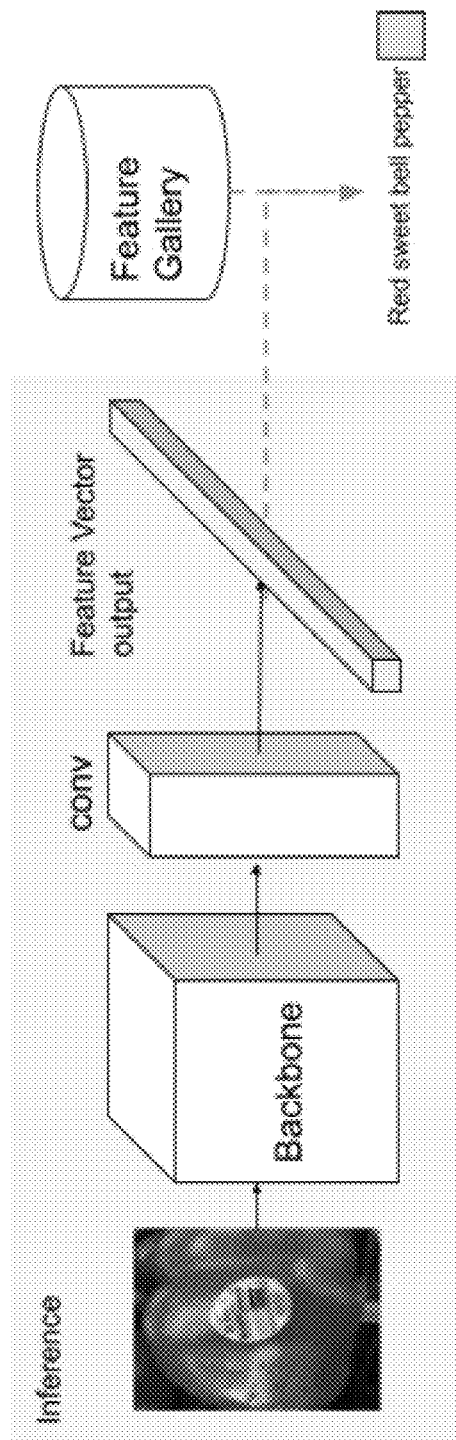
FIG. 21 shows inference flow of an item embedding module according to some embodiments.

Inference of the item embedding module is more straightforward. The network takes item images as inputs and outputs feature representations correspondingly. Predicted feature vectors are then queried to the feature gallery consisting of category feature vectors to obtain the correct category by distance minimum. FIG. 21 shows inference flow of an item embedding module according to some embodiments.

Non-Barcode Identifier Result Fusion Module

Figure 22:
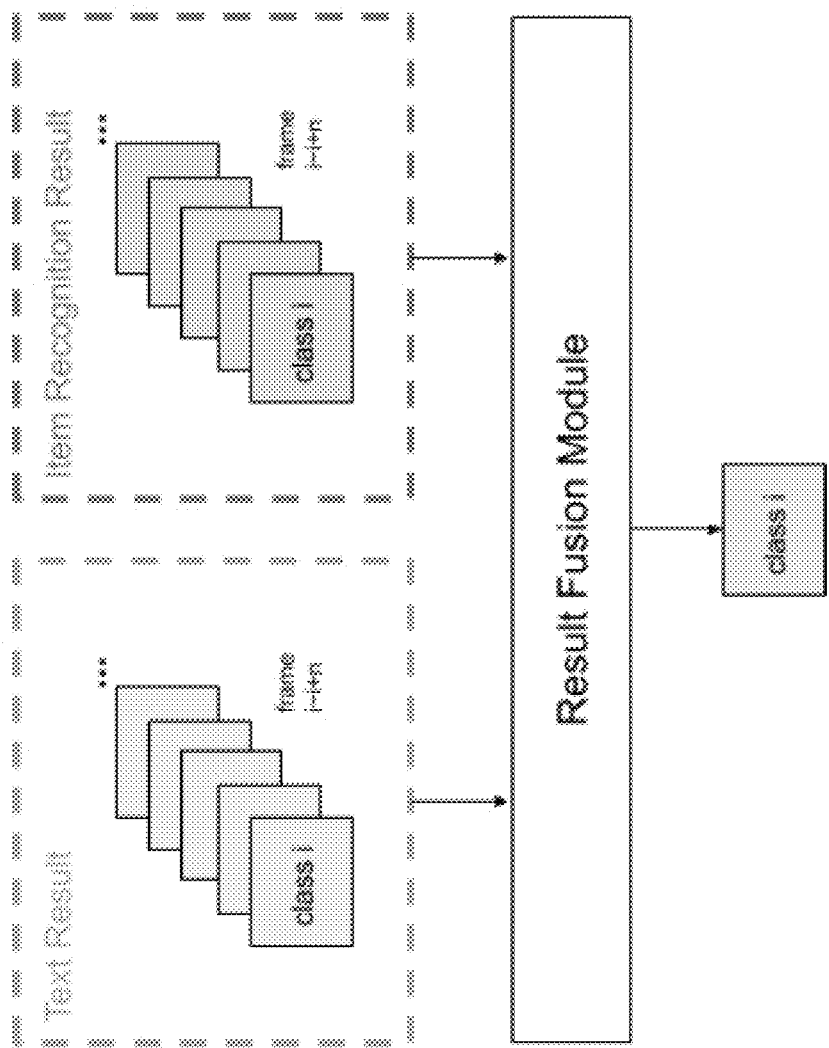
FIG. 22 illustrates the result fusion module according to some embodiments.

The result fusion module accepts categories not only from both the identifier recognition module and the item recognition module, but also from history results. By fusing the results, identifier result fusion module is capable of providing much more reliable and robust predictions. FIG. 22 illustrates the result fusion module according to some embodiments. A core function of the result fusion module is to compare predictions over different models to boost accuracy. In some embodiments, there are several related researches, such as bagging, boosting, stacking, etc. as non-limiting examples. In some embodiments, the result fusion module is configured to assemble results from the identifier recognition module and the item recognition module. The history information is taken into account, such as the fact that only one merchandise item type (e.g., one type of produce) is presented to the system 200 at a time. In some embodiments, the history time period is shorter than the time to place a merchandise item 10 in from the camera(s) 114. The system is configured to give each prediction different weights depending on module accuracy and the timestamp. The weights can be learnt in a machine learning fashion.

Weighted Voting

Figure 23:
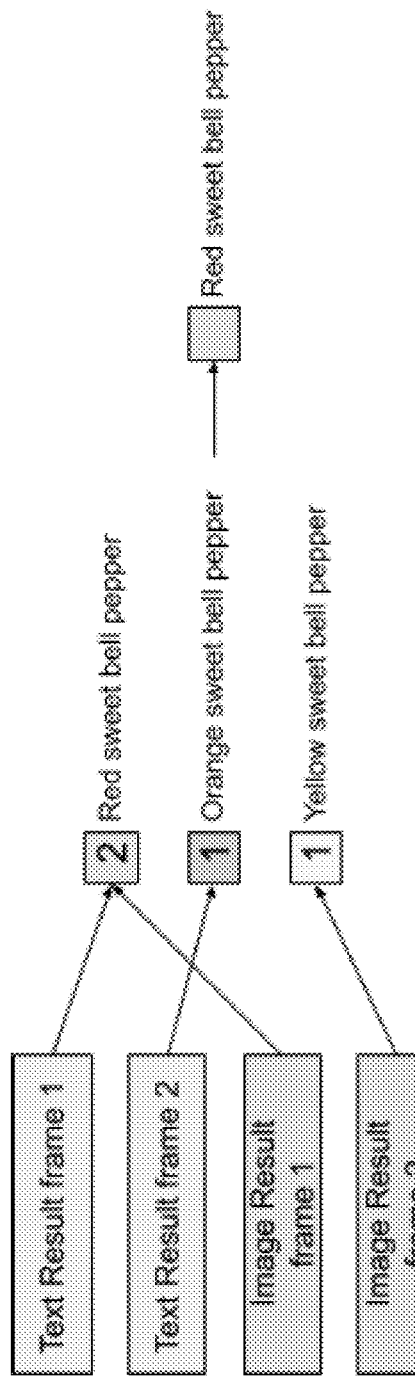
FIG. 23 depicts a voting process according to some embodiments.
Figure 24:
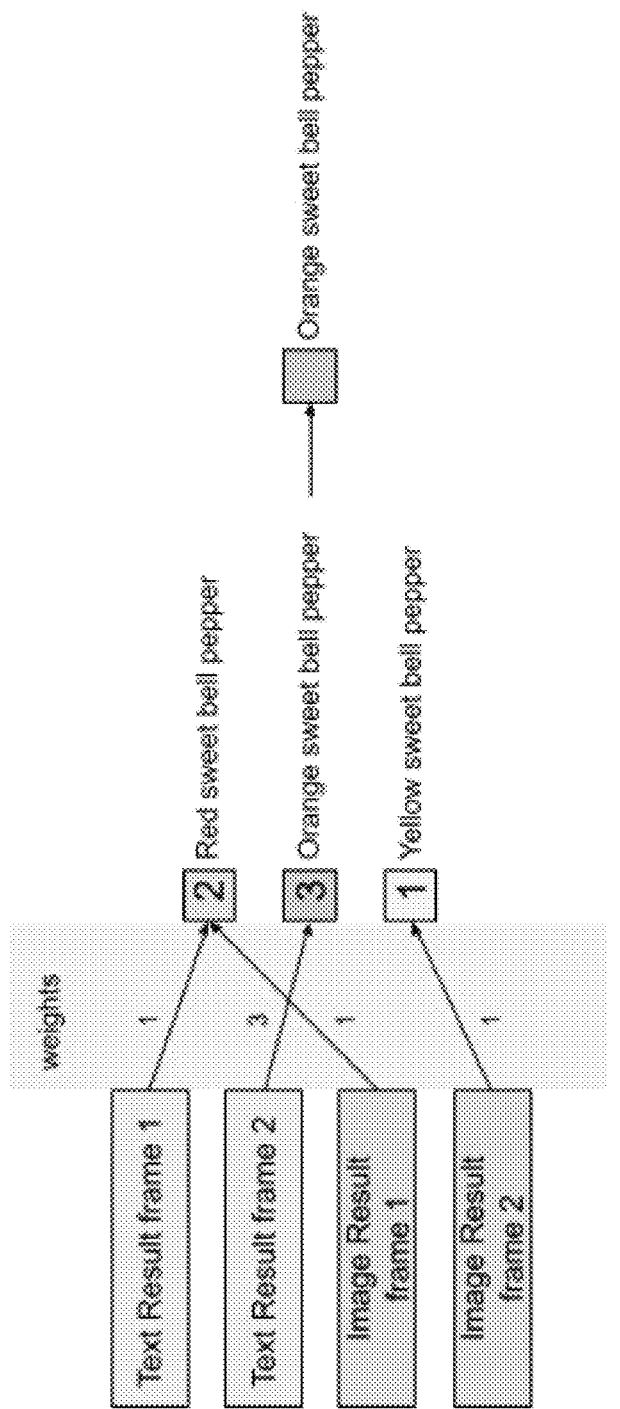
FIG. 24 illustrates weighted voting according to some embodiments.

Voting is an ensemble mechanism that determines fusion prediction by majority predictions among all classifiers. FIG. 23 depicts a voting process according to some embodiments. To illustrate the voting process in a non-limiting example, let's say we have 4 predictions, 2 for Red Sweet Bell Pepper, 1 for Orange Sweet Bell Pepper and 1 for Yellow Sweet Bell Pepper. Then the voting result is Red Sweet Bell Pepper because it's the majority vote. Weighted voting results in a better model because of the weight of each vote. For instance, if the system to counts the vote by the best model 3 times, and if the best model is the one voting for orange sweet bell pepper, then the voting result is the orange sweet bell pepper. FIG. 24 illustrates weighted voting according to some embodiments.

Figure 25:
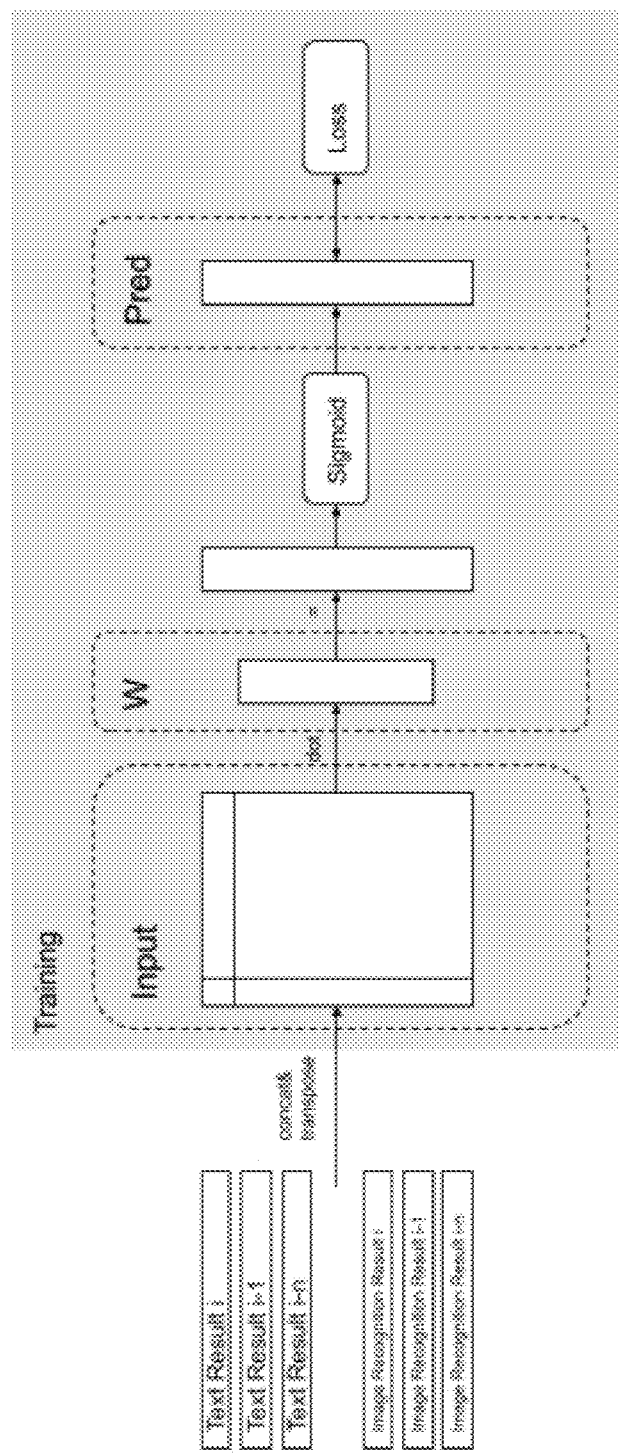
FIG. 25 depicts learning weights for voting according to some embodiments.

In some embodiments, the system is configured to implement weighted voting and take every prediction from either current or history timestamp as a vote, but with different weights. Given the number of categories j and C base classifiers to vote, the prediction category F of weighted voting for each sample is described as $$F = \mathrm{argmax}_j \Sigma_i{}^C p_{ji} \times w_i$$

where is the prediction is binary. If the $i_{th}$ base classifier classifies the p sample into the $j_{th}$ category, then $p_{ji}=1$; otherwise, $p_{ij}=0$. $w_i$ is the weight of the $i_{th}$ base classifier. Weights can be some predefined constants following some strategy, such as the higher the closer to current timestamp, and higher for the better model. However, the weights can also be learnt through machine learning. FIG. 25 depicts learning weights for voting according to some embodiments.

Figure 26:
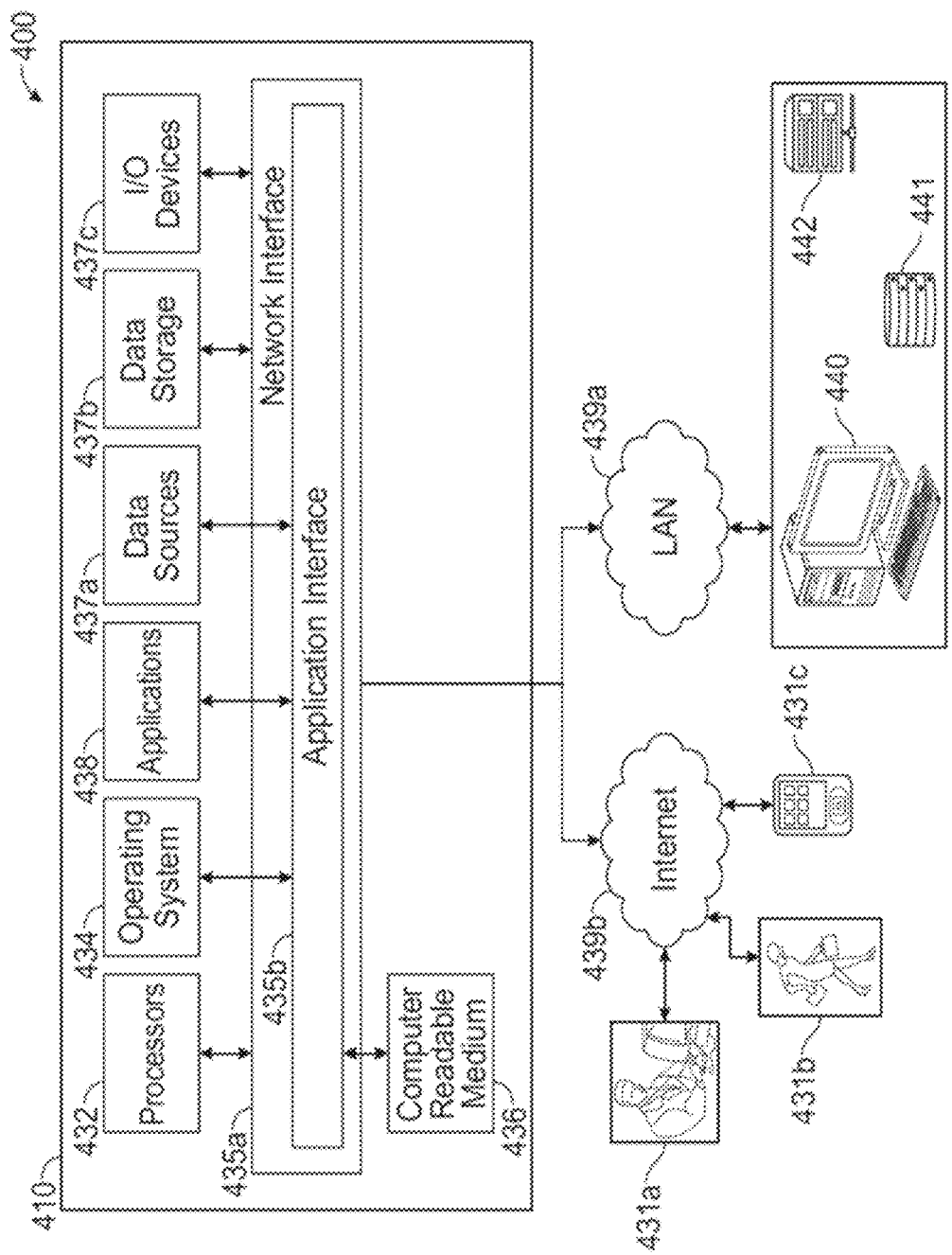
FIG. 26 illustrates a computer system enabling or comprising the systems and methods in accordance with some embodiments of the system.

FIG. 26 illustrates a computer system 410 enabling or comprising the systems and methods in accordance with some embodiments of the system. In some embodiments, the computer system 410 can operate and/or process computer-executable code of one or more software modules of the aforementioned system and method. Further, in some embodiments, the computer system 410 can operate and/or display information within one or more graphical user interfaces (e.g., HMIs) integrated with or coupled to the system.

In some embodiments, the computer system 410 can comprise at least one processor 432. In some embodiments, the at least one processor 432 can reside in, or coupled to, one or more conventional server platforms (not shown). In some embodiments, the computer system 410 can include a network interface 435a and an application interface 435b coupled to the least one processor 432 capable of processing at least one operating system 434. Further, in some embodiments, the interfaces 435a, 435b coupled to at least one processor 432 can be configured to process one or more of the software modules (e.g., such as enterprise applications 438). In some embodiments, the software application modules 438 can include server-based software, and can operate to host at least one user account and/or at least one client account, and operate to transfer data between one or more of these accounts using the at least one processor 432.

With the above embodiments in mind, it is understood that the system can employ various computer-implemented operations involving data stored in computer systems. Moreover, the above-described databases and models described throughout this disclosure can store analytical models and other data on computer-readable storage media within the computer system 410 and on computer-readable storage media coupled to the computer system 410 according to various embodiments. In addition, in some embodiments, the above-described applications of the system can be stored on computer-readable storage media within the computer system 410 and on computer-readable storage media coupled to the computer system 410. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 410 can comprise at least one computer readable medium 436 coupled to at least one of at least one data source 437a, at least one data storage 437b, and/or at least one input/output 437c. In some embodiments, the computer system 410 can be embodied as computer readable code on a computer readable medium 436. In some embodiments, the computer readable medium 436 can be any data storage that can store data, which can thereafter be read by a computer (such as computer 440). In some embodiments, the computer readable medium 436 can be any physical or material medium that can be used to tangibly store the desired information or data or instructions and which can be accessed by a computer 440 or processor 432. In some embodiments, the computer readable medium 436 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 436 can transmit or carry instructions to a remote computer 440 and/or at least one user 431, including a router, private or public network, or other transmission or channel, both wired and wireless. In some embodiments, the software application modules 438 can be configured to send and receive data from a database (e.g., from a computer readable medium 436 including data sources 437a and data storage 437b that can comprise a database), and data can be received by the software application modules 438 from at least one other source. In some embodiments, at least one of the software application modules 438 can be configured within the computer system 410 to output data to at least one user 431 via at least one graphical user interface rendered on at least one digital display.

In some embodiments, the computer readable medium 436 can be distributed over a conventional computer network via the network interface 435a where the system embodied by the computer readable code can be stored and executed in a distributed fashion. For example, in some embodiments, one or more components of the computer system 410 can be coupled to send and/or receive data through a local area network (LAN) 439a and/or an internet coupled network 439b (e.g., such as a wireless internet). In some embodiments, the networks 439a, 439b can include wide area networks (WAN), direct connections (e.g., through a universal serial bus port), or other forms of computer-readable media 436, or any combination thereof.

In some embodiments, components of the networks 439a, 439b can include any number of personal computers 440 which include for example desktop computers, and/or laptop computers, or any fixed, generally non-mobile internet appliances coupled through the LAN 439a. For example, some embodiments include one or more of personal computers 440, databases 441, and/or servers 442 coupled through the LAN 439a that can be configured for any type of user including an administrator. Some embodiments can include one or more personal computers 440 coupled through network 439b. In some embodiments, one or more components of the computer system 410 can be coupled to send or receive data through an internet network (e.g., such as network 439b). For example, some embodiments include at least one user 431a, 431b, is coupled wirelessly and accessing one or more software modules of the system including at least one enterprise application 438 via an input and output ("I/O") 437c. In some embodiments, the computer system 410 can enable at least one user 431a, 431b, to be coupled to access enterprise applications 438 via an I/O 437c through LAN 439a. In some embodiments, the user 431 can comprise a user 431a coupled to the computer system 410 using a desktop computer, and/or laptop computers, or any fixed, generally non-mobile internet appliances coupled through the internet 439b. In some embodiments, the user can comprise a mobile user 431b coupled to the computer system 410. In some embodiments, the user 431b can connect using any mobile computing 431c to wireless coupled to the computer system 410, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of item recognition by artificial intelligence by the use of novel artificial intelligence learning techniques. The disclosure describes the specifics of how a machine including one or more computers comprising one or more processors and one or more non-transitory computer implement the system and its improvements over the prior art. The instructions executed by the machine cannot be performed in the human mind or derived by a human using a pin and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide a technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g., a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless a explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer vision system for identifying merchandise, comprising:
    at least one processor adapted to obtain computer-executable instructions stored on a non-transitory medium that, when executed by the at least one processor, cause the at least one processor to:
        receive one or more images of merchandise selected by a shopper from a camera of a user device;
        identify, in the one or more images of merchandise selected by a shopper, an identifier affixed to the selected merchandise by:
            generating a naïve item category of the selected merchandise; and
            localizing a portion of the image containing the identifier based on the naïve item category;
        identify, based on the one or more images, an actual item category of the selected merchandise; and
        compare the identifier and the actual item category identified in each respective image to identify the merchandise.

2. The computer vision system of claim 1, wherein the identifier includes at least one of a global trade item number (GTIN), a price lookup (PLU) code, or a barcode.

3. The computer vision system of claim 1, wherein identifying the identifier in a respective image comprises:
    applying either an optical character recognition (OCR) or barcode recognition technique to the localized portion of the image containing the identifier to identify text in the identifier.

4. The computer vision system of claim 3, wherein localizing the portion of the respective image containing the identifier comprises:
    detecting a location of the identifier in the image;
    distinguishing, at the detected location, those pixels of the image comprising the identifier from those pixels of the image comprising the selected merchandise; and
    rotating those pixels of the image comprising the identifier into a predetermined orientation.

5. The computer vision system of claim 4, wherein detecting the location of the identifier in the image comprises:
    identifying, in the respective image, a probabilistic region in which the identifier is contained; and
    generating a bounding box surrounding the probabilistic region.

6. The computer vision system of claim 4, wherein distinguishing those pixels of the image comprising the identifier from those pixels of the image comprising the selected merchandise comprises:
    comparing pixels of the image at the location with pixels associated with the naive item category;
    identifying, from the comparison of pixels, those pixels which are dissimilar from the pixels associated with the naive item category; and
    identifying the dissimilar pixels as those pixels comprising the identifier.

7. The computer vision system of claim 4, wherein rotating those pixels of the image comprising the identifier into the predetermined orientation comprises:
    identifying a probabilistic orientation of the identifier in the image;
    determining, based on the probabilistic orientation, a degree by which to rotate the identifier in order to orient the identifier in the predetermined orientation; and
    rotating the identifier by the determined degree.

8. The computer vision system of claim 3, wherein applying an optical character recognition (OCR) technique to the localized portion of the image containing the identifier to identify text in the identifier comprises:
    localizing, using a text detector, text in the localized portion of the image containing the identifier;
    rotating the localized text to a predetermined orientation;
    extracting one or more features of the text using a Convolutional Neural Network (CNN); and
    generating, using a Connectionist Temporal Classification (CTC), an output distribution over all possible text outputs.

9. The computer vision system of claim 8, further including:
    inferring, from the output distribution, a likely output; and
    identifying the text in the identifier by:
        collapsing, in the likely output, any repeats; and
        removing, in the likely output, any blank symbols.

10. The computer vision system of claim 8, further including:
    assessing, from the output distribution, the probability of a given output; and
    identifying the text in the identifier from the output having the highest probability.

11. The computer vision system of claim 3, wherein applying an optical character recognition (OCR) technique to the localized portion of the image containing the identifier to identify text in the identifier comprises:
    localizing, using a text detector, text in the localized portion of the image containing the identifier;
    rotating the localized text to a predetermined orientation;
    splitting characters in the text using image binarizing and contour finding techniques;
    evaluating a batch of the characters using either a deep learning classifier or a machine learning classifier to recognize each character; and
    sequencing the recognized characters.

12. The computer vision system of claim 1, wherein identifying an item category of the selected merchandise comprises:
- localizing a portion of the image containing the selected merchandise;
- generating a feature representation of the selected merchandise depicted in the localized portion of the image; and
- comparing the feature representation of the selected merchandise with feature representations of a plurality of available merchandises in a dataset to identify the available merchandise having a feature representation most similar to that of the selected merchandise.

13. The computer vision system of claim 12,
wherein generating a feature representation of the selected merchandise depicted in the localized portion of the image comprises generating a multi-dimensional vector map of features of the selected merchandise identified from the localized portion of the selected merchandise; and
wherein comparing the feature representation of the selected merchandise with feature representations of a plurality of available merchandises in a dataset to identify the available merchandise having a feature representation most similar to that of the selected merchandise comprises:
- calculating a distance between the feature vectors of the selected merchandise and those of the plurality of available merchandises, and
- identifying the available merchandise having the minimum distances between its feature vectors and those of the selected merchandise.

14. The computer vision system of claim 1, wherein comparing the identifier and item categories identified in each respective image to determine the most likely identification of the merchandise comprises:
- identifying an item category associated with each identifier identified in two or more images of the selected merchandise item;
- select, from amongst the associated item categories and the item categories directly identified in each respective image, the item category identified most often; and
- identify the merchandise based on the item category which appears more often than others.

15. The computer vision system of claim 1, wherein comparing the identifier and item categories identified in each respective image to determine the most likely identification of the merchandise comprises:
- identifying an item category associated with each identifier identified in two or more images of the selected merchandise item;
- apply a weighting factor to each respective associated item category and each item categories directly identified in each image;
- identify the merchandise based on the item category which appears more often than others, taking into account the applied weighting factors.

16. A method, performed by a computer vision system for identifying merchandise comprising at least one processor adapted to obtain computer-executable instructions stored on a non-transitory medium, comprising:
- receiving one or more images of merchandise selected by a shopper from a camera of a user device;
- identifying, in the one or more images of merchandise selected by a shopper, an identifier affixed to the selected merchandise by:
  - generating a naïve item category of the selected merchandise; and
  - localizing a portion of the image containing the identifier based on the naïve item category;
- identifying, based on the one or more images, an actual item category of the selected merchandise; and
- comparing the identifier and the actual item category identified in each respective image to identify the merchandise.

17. The method of claim 16, wherein the identifier includes at least one of a global trade item number (GTIN), a price lookup (PLU) code, or a barcode.

18. The method of claim 16, wherein identifying the identifier in a respective image comprises:
- applying either an optical character recognition (OCR) or barcode recognition technique to the localized portion of the image containing the identifier to identify text in the identifier.

19. The method of claim 18, wherein localizing the portion of the respective image containing the identifier comprises:
- detecting a location of the identifier in the image;
- distinguishing, at the detected location, those pixels of the image comprising the identifier from those pixels of the image comprising the selected merchandise; and
- rotating those pixels of the image comprising the identifier into a predetermined orientation.

20. The method of claim 19, wherein detecting the location of the identifier in the image comprises:
- identifying, in the respective image, a probabilistic region in which the identifier is contained; and
- generating a bounding box surrounding the probabilistic region.

21. The method of claim 19, wherein distinguishing those pixels of the image comprising the identifier from those pixels of the image comprising the selected merchandise comprises:
- comparing pixels of the image at the location with pixels associated with the naive item category;
- identifying, from the comparison of pixels, those pixels which are dissimilar from the pixels associated with the naive item category; and
- identifying the dissimilar pixels as those pixels comprising the identifier.

22. The method of claim 19, wherein rotating those pixels of the image comprising the identifier into the predetermined orientation comprises:
- identifying a probabilistic orientation of the identifier in the image;
- determining, based on the probabilistic orientation, a degree by which to rotate the identifier in order to orient the identifier in the predetermined orientation; and
- rotating the identifier by the determined degree.

23. The method of claim 18, wherein applying an optical character recognition (OCR) technique to the localized portion of the image containing the identifier to identify text in the identifier comprises:
- localizing, using a text detector, text in the localized portion of the image containing the identifier;
- rotating the localized text to a predetermined orientation;
- extracting one or more features of the text using a Convolutional Neural Network (CNN); and
- generating, using a Connectionist Temporal Classification (CTC), an output distribution over all possible text outputs.

24. The method of claim 23, further including:
- inferring, from the output distribution, a likely output; and identifying the text in the identifier by:
  collapsing, in the likely output, any repeats; and
  removing, in the likely output, any blank symbols.
25. The method of claim 23, further including:
assessing, from the output distribution, the probability of a given output; and
identifying the text in the identifier from the output having the highest probability.
26. The method of claim 18, wherein applying an optical character recognition (OCR) technique to the localized portion of the image containing the identifier to identify text in the identifier comprises:
  localizing, using a text detector, text in the localized portion of the image containing the identifier;
  rotating the localized text to a predetermined orientation;
  splitting characters in the text using image binarizing and contour finding techniques;
  evaluating a batch of the characters using either a deep learning classifier or a machine learning classifier to recognize each character; and
  sequencing the recognized characters.
27. The method of claim 16, wherein identifying an item category of the selected merchandise comprises:
  localizing a portion of the image containing the selected merchandise;
  generating a feature representation of the selected merchandise depicted in the localized portion of the image; and
  comparing the feature representation of the selected merchandise with feature representations of a plurality of available merchandises in a dataset to identify the available merchandise having a feature representation most similar to that of the selected merchandise.
28. The method of claim 27,
wherein generating a feature representation of the selected merchandise depicted in the localized portion of the image comprises generating a multi-dimensional vector map of features of the selected merchandise identified from the localized portion of the selected merchandise; and
wherein comparing the feature representation of the selected merchandise with feature representations of a plurality of available merchandises in a dataset to identify the available merchandise having a feature representation most similar to that of the selected merchandise comprises:
  calculating a distance between the feature vectors of the selected merchandise and those of the plurality of available merchandises, and
  identifying the available merchandise having the minimum distances between its feature vectors and those of the selected merchandise.
29. The method of claim 16, wherein comparing the identifier and item categories identified in each respective image to determine the most likely identification of the merchandise comprises:
  identifying an item category associated with each identifier identified in two or more images of the selected merchandise item;
  select, from amongst the associated item categories and the item categories directly identified in each respective image, the item category identified most often; and
  identify the merchandise based on the item category which appears more often than others.
30. The method of claim 16, wherein comparing the identifier and item categories identified in each respective image to determine the most likely identification of the merchandise comprises:
  identifying an item category associated with each identifier identified in two or more images of the selected merchandise item;
  apply a weighting factor to each respective associated item category and each item categories directly identified in each image;
  identify the merchandise based on the item category which appears more often than others, taking into account the applied weighting factors.

* * * * *